(12) United States Patent
Urien et al.

(10) Patent No.: US 12,518,639 B2
(45) Date of Patent: Jan. 6, 2026

(54) AIRCRAFT MISSION CALCULATION SYSTEM INDICATING A RISK OF LOSS OF OPTIMALITY OF THE TRAJECTORY ACTUALLY FOLLOWED BY THE AIRCRAFT AND RELATED METHOD

(71) Applicant: DASSAULT AVIATION, Paris (FR)

(72) Inventors: Benoît Urien, Saint-Cloud (FR); Cyrille Grimald, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 257 days.

(21) Appl. No.: 17/967,601

(22) Filed: Oct. 17, 2022

(65) Prior Publication Data
US 2023/0123233 A1 Apr. 20, 2023

(30) Foreign Application Priority Data
Oct. 18, 2021 (FR) ...................... 21 11028

(51) Int. Cl.
*G08G 5/34* (2025.01)
*B64D 45/00* (2006.01)
*G01C 21/20* (2006.01)
*G08G 5/21* (2025.01)

(52) U.S. Cl.
CPC ............... *G08G 5/34* (2025.01); *B64D 45/00* (2013.01); *G01C 21/20* (2013.01); *G08G 5/21* (2025.01)

(58) Field of Classification Search
CPC .... G01C 21/20; G01C 23/005; G08G 5/0039; G08G 5/0034; B64D 45/00
See application file for complete search history.

(56) References Cited

U.S. PATENT DOCUMENTS

| | | | |
|---|---|---|---|
| 10,467,913 B1* | 11/2019 | Suiter | G08G 5/58 |
| 10,867,521 B2 | 12/2020 | Grimald | |
| 2018/0010916 A1 | 1/2018 | Roger et al. | |
| 2018/0144643 A1* | 5/2018 | Moravek | B64D 43/00 |
| 2019/0164440 A1 | 5/2019 | Briand et al. | |

(Continued)

FOREIGN PATENT DOCUMENTS

| | | |
|---|---|---|
| EP | 1273987 A2 | 1/2003 |
| EP | 1273987 A3 | 4/2005 |
| EP | 3715786 A1 | 9/2020 |

OTHER PUBLICATIONS

Search Report for priority application FR 21 11028.

*Primary Examiner* — James M Mcpherson
*Assistant Examiner* — Clint Pham
(74) *Attorney, Agent, or Firm* — Davidson Kappel LLC

(57) ABSTRACT

An aircraft mission calculation system is for indicating a risk of loss of optimality of the trajectory actually flown by the aircraft. The system includes a first trajectory calculation module, configured to calculate an optimal mission trajectory between a geographical point of origin and a geographical point of destination. The first calculation module is configured to calculate a plurality of iso-displacement curves from the geographical point of origin to the geographical point of destination. The system comprises a module for determining a level of risk of loss of optimality of the trajectory actually taken by the aircraft, associated with a modification of the trajectory of the aircraft with respect to the calculated mission trajectory, the display manager displaying on the display, in addition to the calculated trajectory, an indicator of the determined level of risk.

13 Claims, 10 Drawing Sheets

(56) References Cited

U.S. PATENT DOCUMENTS

| | | |
|---|---|---|
| 2019/0295425 A1 | 9/2019 | Grimald et al. |
| 2020/0020237 A1 | 1/2020 | Grimald et al. |
| 2020/0168104 A1* | 5/2020 | Holder ................ G08G 5/0039 |
| 2020/0302805 A1* | 9/2020 | Grimald ............... G06Q 10/047 |
| 2021/0020049 A1* | 1/2021 | Nathan ................ G08G 5/0021 |

* cited by examiner

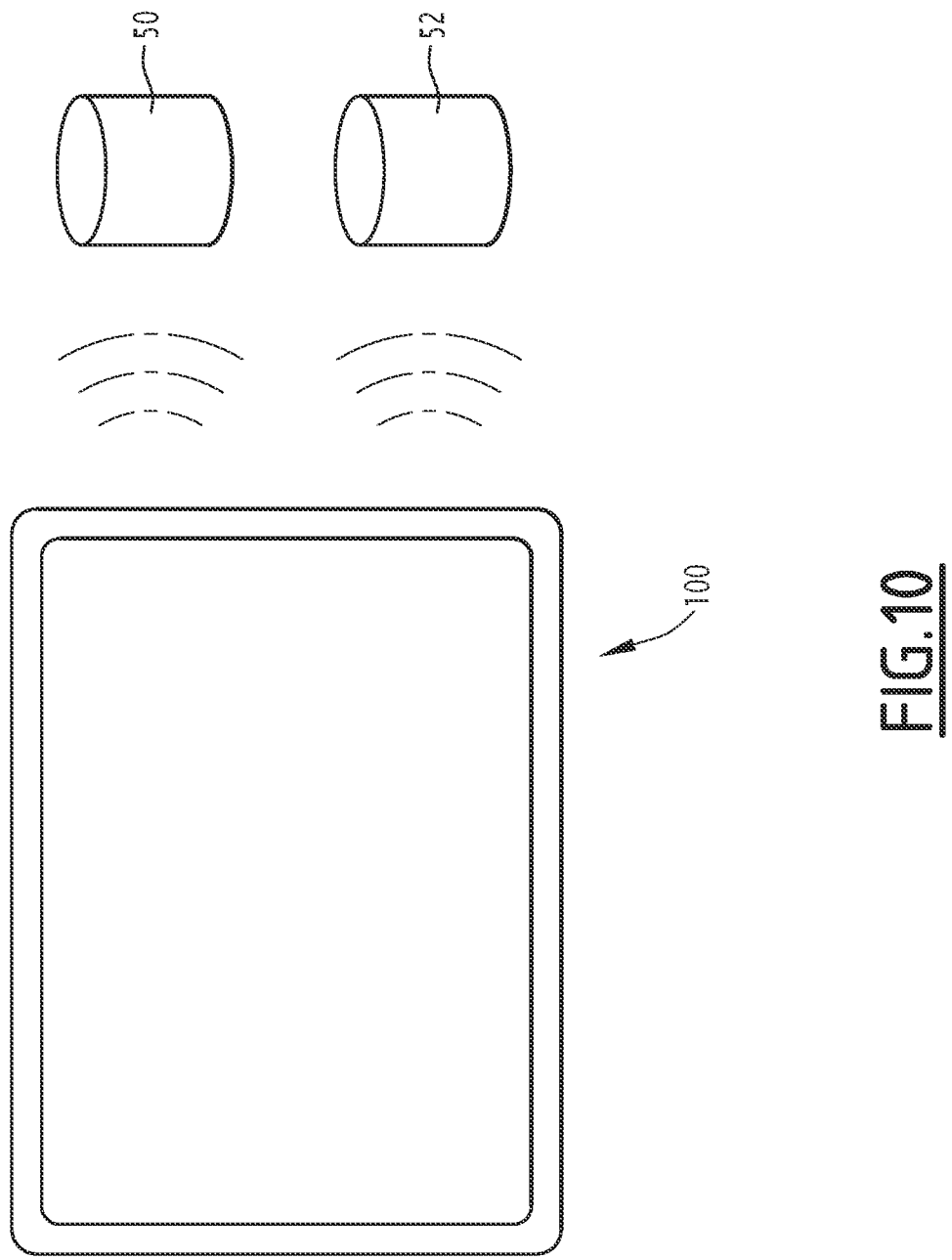

US 12,518,639 B2

AIRCRAFT MISSION CALCULATION SYSTEM INDICATING A RISK OF LOSS OF OPTIMALITY OF THE TRAJECTORY ACTUALLY FOLLOWED BY THE AIRCRAFT AND RELATED METHOD

TECHNICAL FIELD

The present disclosure relates to an aircraft mission calculation system having an engine for calculating the trajectory of the aircraft during the mission, the calculation engine comprising:
 a first trajectory calculation module, suitable for calculating an optimal mission trajectory between a geographical point of origin and a geographical point of destination, as a function of aircraft performance, operational mission specifications and a weather context, preferably an evolving weather context, in a mission volume between the geographical point of origin and the geographical point of destination;
 the first trajectory calculation module being adapted to calculate a plurality of iso-displacement curves from the geographical point of origin to the geographical point of destination, and to calculate the trajectory from points on the iso-displacement curves;
 a display, and a display manager for displaying the calculated trajectory on the display.

The present disclosure is applicable to aircraft used in civil aviation, in particular in business aviation.

Such a calculation system is intended to be integrated into a cockpit, in parallel with a flight management system (FMS), to enable the crew to determine mission trajectories.

Alternatively, the calculation system is suitable for integration into a non-onboard mission planning system, e.g. in an airport aircraft trajectory infrastructure, in an Electronic Flight Bag (EFB), and/or in a portable electronic device (e.g. a tablet), or in a PC or ground server.

The calculation system is adapted to determine a complete trajectory of the aircraft in the horizontal plane and in the vertical plane over several flight levels between a first geographical point of origin and a second geographical point of destination. The mission consists of one or more legs.

BACKGROUND

The preparation and definition of an aircraft mission between a first geographical point and a second geographical point is a time-consuming task. This includes determining the route the aircraft will take, the associated flight profile, the passenger, cargo and fuel load, and low speed performance calculations, as well as checking the aircraft's flight domain.

This definition is done as a function of a mission context including weather, air routes to be flown, connectivity with satellite communication systems, and an aircraft context which includes the configuration and type of aircraft used, as well as its operational status.

Typically, in civil aviation, airlines and/or external suppliers have calculation systems allowing to provide a flight plan and expected aircraft performance, for example a required amount of fuel.

In business aviation, the constraints weighing on the crew are significant and specific. Customers sometimes ask the crew to meet more stringent mission criteria, for example in terms of passenger comfort during the flight, the possibility of connecting to satellite transmission systems, the weight offered by the aircraft, etc.

In addition, mission conditions, including take-off times, are subject to change and the destination can change rapidly depending on the passengers' own needs.

In this context, existing flight plan delivery systems are not fully satisfactory.

In particular, these systems are designed to operate on a sum of input criteria (speed, flight level, number of passengers, etc.) to which a single navigation solution will correspond. It is therefore frequently necessary to carry out several iterations to adjust the mission assumptions.

The results obtained by flight plan provider systems are also generally incomplete in terms of the criteria required to perform the mission, particularly in the management of customer criteria, aircraft context, and performance.

As a result, the trajectory solutions proposed by the supplier are not satisfactory to the customer and/or result in non-optimal flight time and/or increased fuel consumption.

To overcome these problems, U.S. Pub. No. 2020/0302805A1 proposes a mission calculation system of the aforementioned type that allows the user to obtain optimised trajectories in a very flexible manner, respecting the mission specifications and taking into account weather phenomena.

Such a system can still be improved. Indeed, as the mission calculation system is predictive, it is possible that in some cases, weather phenomena or other mission constraints may change during the mission, or might not exactly conform to the prediction.

Furthermore, during the execution of the mission, the user may be forced to deviate from the optimal trajectory initially defined, for reasons of air traffic, weather, or other reasons.

The user of the mission calculation system is therefore not certain that they will be able to follow the trajectory calculated by the mission calculation system with a high degree of accuracy over the entire duration of the mission. The crew may be forced, in some cases, to reconfigure the trajectory laterally and/or vertically, without knowing in advance what influence this reconfiguration will have on the conduct of the mission.

SUMMARY

An aim of the present disclosure is to provide a mission calculation system that allows the robustness of an optimised trajectory to be assessed, with regard to possible changes to the trajectory, taking into account, in particular, the weather context or the operational mission specifications.

A calculation system of the aforementioned type is provided that includes a calculation engine comprises a module for determining a level of risk of loss of optimality of the trajectory actually taken by the aircraft, associated with a modification of the trajectory of the aircraft with respect to the calculated trajectory, the display manager being suitable for displaying on the display, in addition to the calculated trajectory, an indicator of the determined level of risk.

The calculation system may comprise one or more of the following features, taken alone or in any combination that is technically possible:
 the risk level is determined for a plurality of points on the calculated trajectory, the display manager being adapted to display a risk level indicator corresponding to several points on the calculated trajectory;
 the risk level determination module is adapted to determine a sock around the calculated trajectory, the sock containing the calculated trajectory, the risk level being given by the distance between the calculated trajectory and the edges of the sock, the display manager being adapted to display a risk level indicator formed by at least the edges of the sock;

the risk level determination module is suitable for determining the sock in projection in a horizontal plane, the risk level being given by the transverse distance between the calculated trajectory and the side edges of the sock;

the risk level determination module is adapted to determine the sock in projection in a vertical plane, the risk level being defined by the distance between the trajectory and the upper and lower edges of the sock;

the risk level determination module is adapted to determine the risk level by calculating, from the calculated trajectory, inverse iso-displacement curves from the geographical point of destination to the geographical point of origin, and then determining the intersection between at least one iso-displacement curve and at least one inverse iso-displacement curve;

when the iso-displacement curve containing a point of the calculated trajectory is obtained after a number N1 of displacement increments, the inverse iso-displacement curve used by the determination module to obtain the intersection is the one corresponding to a number N2 of displacement increments calculated by equation:

$$N2=N-N1+1$$

where N is the total number of displacement increments required to connect the geographical point of origin to the geographical point of destination along the calculated trajectory;

the iso-displacement curves and inverse iso-displacement curves are respectively vertical iso-displacement curves and vertical inverse iso-displacement curves defined along the trajectory calculated in projection in a vertical plane by determining the points located at the same displacement increment of at least one point of a vertical iso-displacement curve;

each iso-displacement curve is an isochronous curve, the first trajectory calculation module being adapted to calculate a trajectory minimising the time between the geographical point of origin and the geographical point of destination, or wherein each iso-displacement curve is an fuel iso-consumption curve, the first trajectory calculation module being adapted to calculate a trajectory minimising fuel consumption between the geographical point of origin and the geographical point of destination, or wherein each iso-displacement curve is an iso-cost curve, the cost being defined as a function of travel time and fuel consumed, the first trajectory calculation module being adapted to calculate a trajectory minimising the cost between the geographical point of origin and the geographical point of destination;

the first trajectory calculation module is adapted to calculate a plurality of iso-displacement curves from at least one chosen point accessible to the aircraft, at a displacement interval corresponding to several successive displacement increments of the aircraft from the chosen point, the iso-displacement curves being obtained at the displacement interval for a displacement of the aircraft to a given flight level from displacements of the aircraft at separate flight levels, and to be determined on the basis of the iso-displacement curves to the given flight level obtained at separate flight levels, taken at the same aircraft displacement interval, at least one extended iso-displacement curve to the given flight level maximising the displacement of the aircraft from the geographical point of origin or minimising the displacement of the aircraft towards the geographical point of destination, the first trajectory calculation module being adapted to define the calculated trajectory from a plurality of trajectory segments, each trajectory segment being defined at a given flight level for a plurality of iso-displacement curves at the flight level corresponding to the given flight level from an extended iso-displacement curve or/and towards an extended iso-displacement curve;

the loss of optimality includes an increase in flight time from origin to destination and/or an increase in fuel consumption compared to the calculated trajectory.

A method of calculating an aircraft mission is also provided, implemented by a trajectory calculation system comprising an engine for calculating the trajectory of the aircraft during the mission, the method comprising the following steps:

calculation, by a first trajectory calculation module of the calculation engine, of an optimal mission trajectory between a geographical point of origin and a geographical point of destination, as a function of aircraft performance, mission operational specifications and a weather context, preferably an evolving one, in a mission volume between the geographical point of origin and the geographical point of destination, the first trajectory calculation module calculating a plurality of iso-displacement curves from the geographical point of origin to the geographical point of destination, and calculating the trajectory from points on the iso-displacement curves;

displaying the calculated trajectory on a display system of the mission calculation system by a display manager on the display system;

determination, by a determination module of the calculation engine, of a level of risk of loss of optimality of the trajectory actually taken by the aircraft, associated with a modification of the trajectory of the aircraft with respect to the calculated trajectory, the display manager displaying on the display system, in addition to the calculated trajectory, an indicator of the determined level of risk.

The method according to the present disclosure may comprise one or more of the following features, taken alone or in any combination that is technically possible:

the method comprises the determination, by the risk level determination module, of a sock around the calculated trajectory, the sock containing the calculated trajectory, the risk level being given by the distance between the calculated trajectory and the edges of the sock, the display manager displaying a risk level indicator formed by at least the edges of the sock;

the determination module determines the risk level by calculating, from the calculated trajectory, inverse iso-displacement curves from the geographical point of destination to the geographical point of origin, and then determining the intersection between at least one iso-displacement curve and at least one inverse iso-displacement curve;

the risk level determination module determines the sock in projection in a horizontal plane, the risk level being given by the transverse distance between the calculated trajectory and the lateral edges of the sock or/and wherein the risk level determination module determines the sock in projection in a vertical plane, the risk level being defined by the distance between the trajectory and the upper and lower edges of the sock.

BRIEF SUMMARY OF THE DRAWINGS

The present disclosure will be better understood upon reading the following description, given only as an example, and with reference to the attached drawings, in which:

FIG. 10 is a schematic view illustrating a second mission calculation system according to the present disclosure.

DETAILED DESCRIPTION

Figure 1:
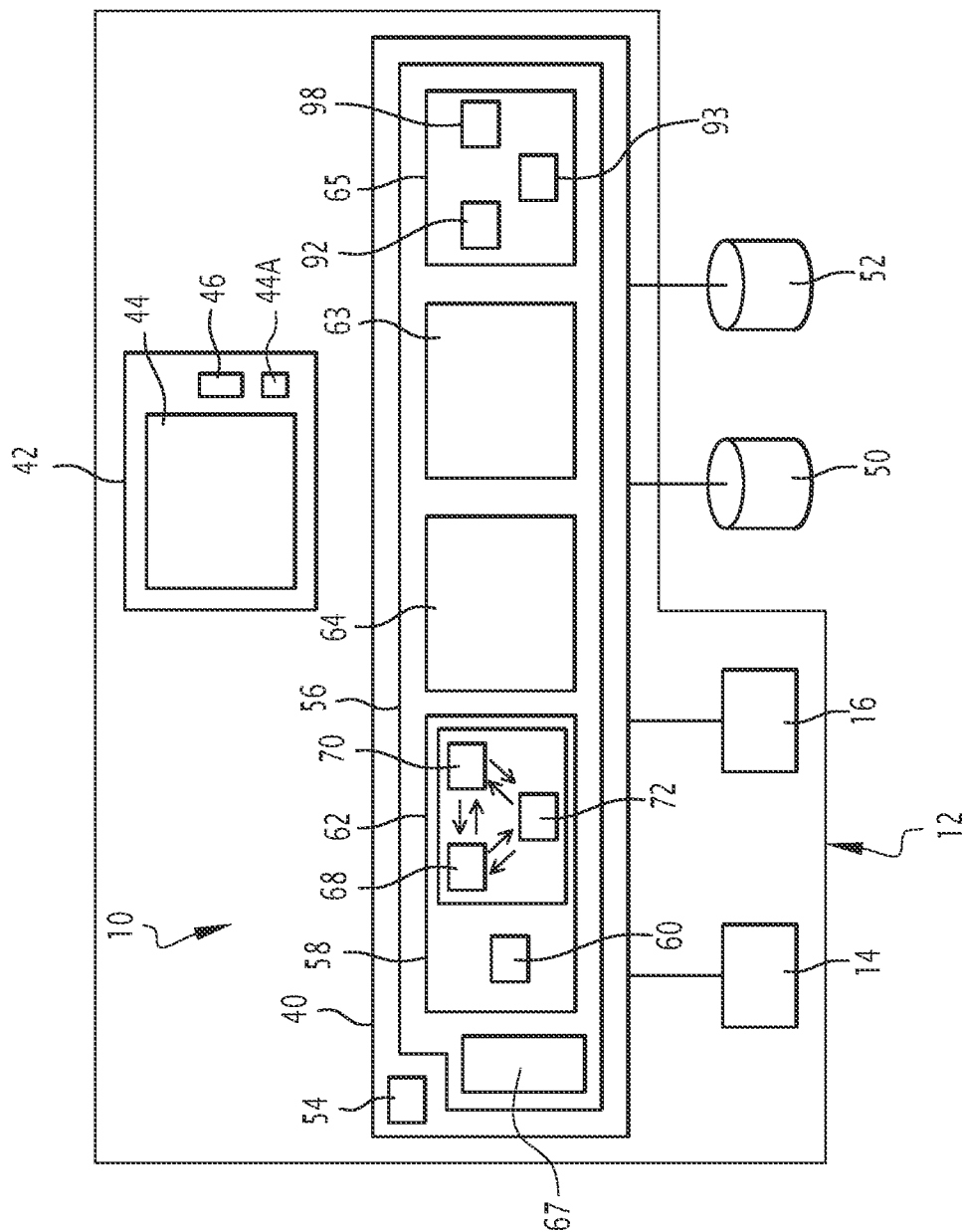
FIG. 1 is a block diagram illustrating a first mission calculation system according to the present disclosure.

A first mission calculation system 10 according to the present disclosure, which in this example is present in the cockpit 12 of an aircraft, is illustrated in FIG. 1.

The aircraft is preferably a civil aircraft, in particular a business aircraft.

In a known way, the cockpit 12 of the aircraft is intended to control all the systems of the aircraft during its use.

The cockpit 12 comprises, in addition to the mission calculation system 10, a flight management system 14 for the aircraft cockpit and a system 16 for controlling and monitoring the various aircraft systems.

The flight management system 14 is intended to assist the aircraft pilot in navigating the aircraft during a mission. It is able to provide information on the route flown by the aircraft, and on the aircraft's dynamic parameters such as fuel consumption.

Figure 3:
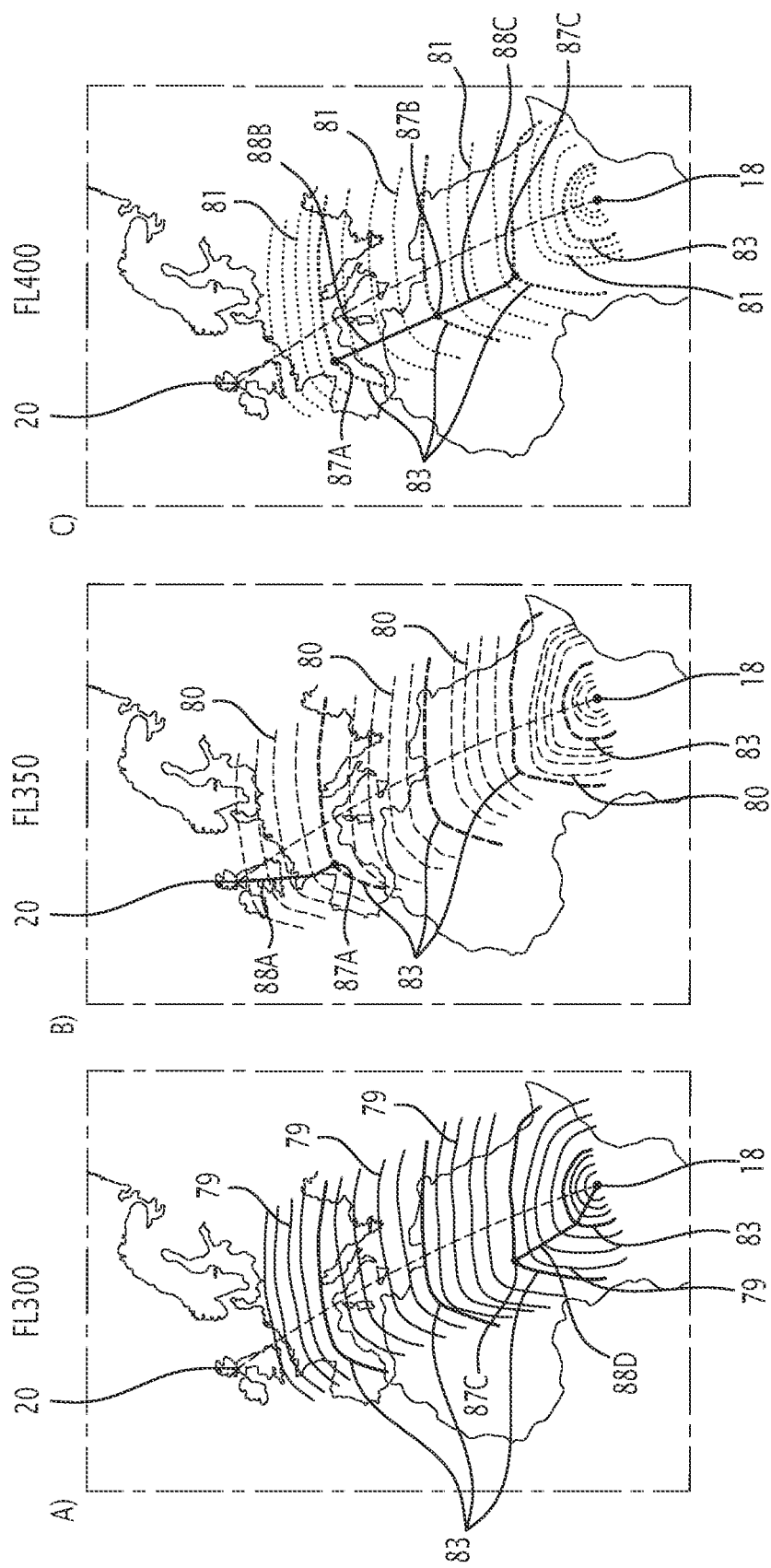
FIG. 3 is a view illustrating the derivation of a trajectory from extended isochrones.

It is also adapted to guide the aircraft to follow a predetermined trajectory between a first geographical point of origin 18 and a second geographical point of destination 20 (visible in particular in FIG. 3).

The system 16 for controlling and monitoring the various aircraft systems is intended in particular to enable the crew to monitor and possibly pilot all the aircraft systems. In particular, it is suitable for determining an operating state of the aircraft, including the presence of faults and failures on the aircraft on the ground and/or in flight. As will be seen below, the mission calculation system 10 according to the present disclosure is connected to the management system 16 to take into account the state of the aircraft in the mission calculations.

Figure 9:
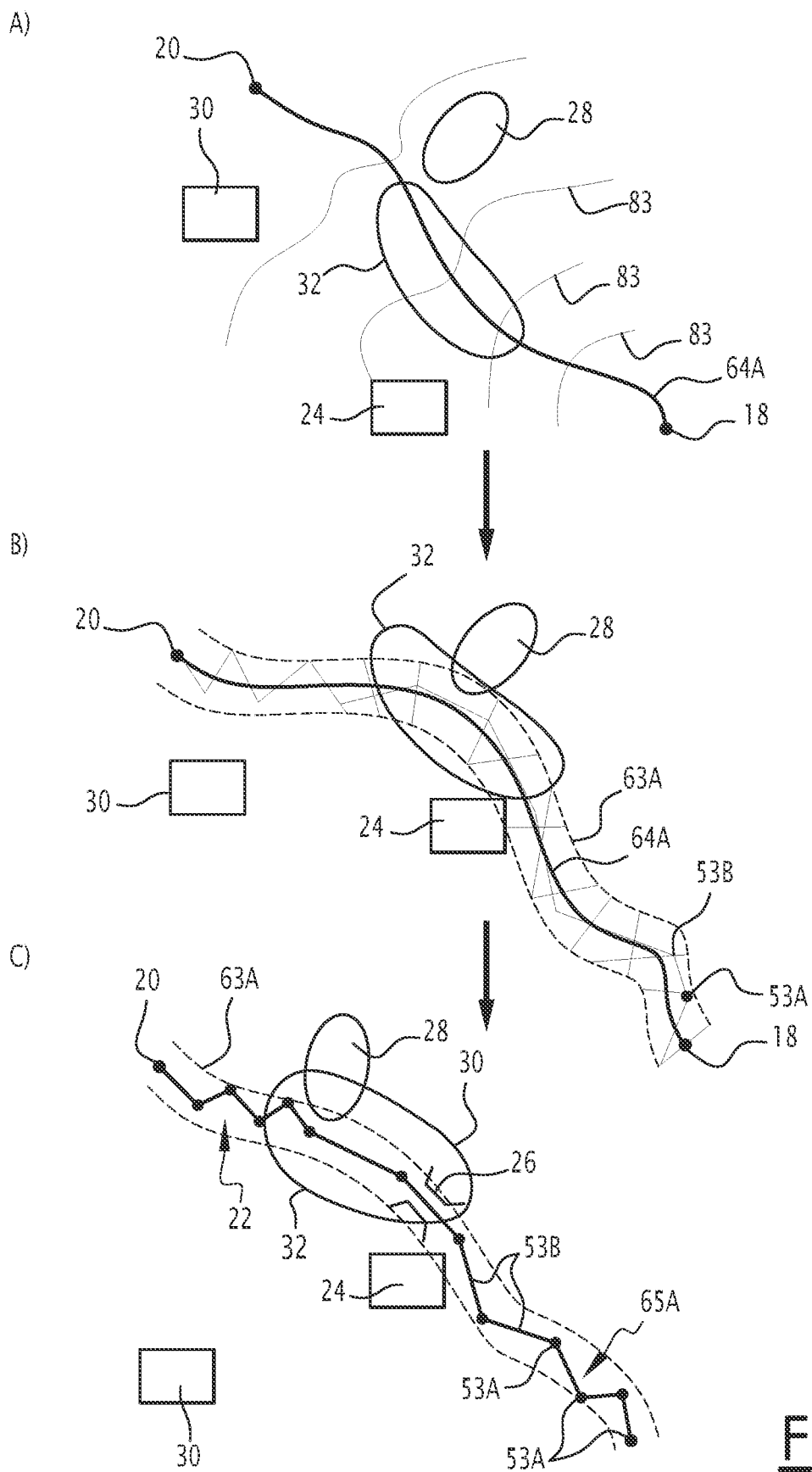
FIG. 9 is a view illustrating an embodiment of the present disclosure in which a step of switching from a free trajectory to a trajectory constrained by air routes has been performed.

The mission performed by the aircraft comprises at least one leg 22, shown schematically in FIG. 9, between a first geographical point 18 of origin and a second geographical point 20 of destination. In some cases (not shown), the mission performed by the aircraft comprises a plurality of successive legs 22, with the second geographical point 20 of destination of a first leg constituting the first geographical point 18 of origin of a second leg.

The mission is performed according to operational specifications which comprise a mission context and an aircraft context.

The mission context comprises, for example, at least one operational constraint, in particular a number of passengers to be transported, a maximum take-off weight linked in particular to an available runway length, a navigation fuel load, a reserve fuel load, a required departure schedule and/or arrival schedule, a maximum distance to be covered, and/or a distance to an alternative terrain en route.

With reference to FIG. 9, the mission context advantageously comprises navigational constraints, such as for example forbidden zones 24 or flight levels, required air routes 26 or imposed flight levels, or more generally free flight zones and/or airway-imposed flight zones.

The mission context advantageously comprises weather constraints such as zones 28 of dangerous weather phenomena, particularly frost or cumulonimbus formation.

The mission context may also comprise passenger comfort constraints, in particular zones 30 of turbulence to be avoided, in particular as a function of a desired level of turbulence, chosen for example from among a low level, a medium level and a high level of turbulence, or zones 32 of satellite telecommunication coverage to allow telecommunication between the aircraft and the outside world, in particular on the ground, in particular chosen from among a low level, a medium level and a good level of communication possibility.

In this example, the individual zones 24 to 32 are preferably defined by horizontal coordinates (e.g. latitude and longitude) and by vertical coordinates in altitude. In some cases, the position of the zones 24 to 32 advantageously evolves over time. In these cases, the above-mentioned coordinates evolve over time, defining a four-dimensional (or 4D) zone of avoidance or, on the contrary, a four-dimensional zone of desired or constrained passage.

The zones 24 to 32 therefore define, in the horizontal plane illustrated in FIG. 9, horizontal sections of avoidance or, on the contrary, horizontal sections of desired or constrained passage. They also define, in the vertical plane illustrated in FIG. 4, vertical sections for avoidance or, on the contrary, vertical sections for desired or constrained passage.

The aircraft context may comprise usage constraints related to dispatches and/or constraints related to a particular aircraft condition in terms of faults and/or failures on one or more aircraft equipment.

For example, a dispatch related to certain aircraft defects may impose a maximum flight level and/or a maximum speed. A landing gear or flap retraction failure can also impose an increased fuel consumption constraint.

The mission calculation system 10 is intended to establish a trajectory for the aircraft to perform the step 22 between at least a first geographical point 18 of origin and at least a second geographical point 20 of destination, taking into account operational specifications, including the mission context and the aircraft context, while following existing air routes.

The trajectory obtained through the mission calculation system 10 includes the aircraft's route in latitude and longitude, with a vertical flight profile, defined by one or more altitudes and transit times. The route is therefore determined in four dimensions.

Advantageously, the mission calculation system 10 is further adapted to establish flight plan parameters, including aircraft weight and balance, take-off and landing card (i.e. flight data for the pilot related to guidance such as speeds V1, V2, VR on the runway, acceleration at brake release, engine speed at take-off, and/or attitude at take-off), calculation of take-off and landing weight limits, low speed (i.e. surface) and high speed (i.e. en-route) weather, air traffic control information (ATIS for "Automated Terminal Information Service", e-NOTAM for "Notice to Airmen", telecommunication frequency, FIRS for "Flight Information Regions", air traffic control center), and/or alternative airfields available at destination, and on way.

With reference to FIG. 1, the mission calculation system 10 comprises a calculation engine 40 and, advantageously, a user interface 42 for parameterisation and feedback forming a mission board.

The user interface 42 comprises, for example, at least one display system 44, a display manager 44A on the display 44 and at least one member 46 for selection and input of information by the user, which may be a real or virtual keyboard, a mouse and/or a touch system.

The user interface 42 is adapted to allow the user to enter at least some of the operational specifications, including geographical points of origin and destination 18, 20, waypoints, desired times, desired loads, maximum wind on way, etc.

It is advantageously suitable for allowing the user to define at least part of the mission context, in particular the navigation and passenger comfort constraints, and/or to define at least part of the aircraft context.

An example of an interface 42 is described in U.S. Pub. No. 2019/0164440A1, which is hereby incorporated by reference herein.

As will be seen below, the display manager 44A is suitable for displaying on the display system 44 a two-dimensional representation in a horizontal or vertical plane of the topographical environment in which the aircraft is evolving, of the trajectory calculated by the calculation system 10 in the topographical environment and, according to the present disclosure, an indicator of the level of risk of loss of optimality of the trajectory actually followed by the aircraft, associated with a modification of the trajectory with respect to the calculated trajectory.

The actual trajectory followed by the aircraft is the one followed by the aircraft during the flight, deviating from the calculated trajectory, following a trajectory change. This trajectory change may result, for instance, from an instruction from air traffic control, or a voluntary change by the pilot, e.g. due to weather conditions or an evasive procedure.

"Loss of optimality of the trajectory actually followed by the aircraft" means, for example, a lengthening of the flight time between the point of origin 18 and the point of destination 20 or/and an increase in fuel consumption, compared to the calculated trajectory which represents an optimum in terms of flight time or/and in terms of consumption.

This indicator allows the pilot to define which trajectory modification is likely to lead to a significant loss of optimality. As will be seen below, the significant loss of optimality is, for example, an increase in flight time greater than the time increment of the isochronous curve calculation, and/or a fuel consumption greater than the fuel quantity increment of the fuel iso-consumption curve calculation.

The calculation engine 40 is connected to the interface 42. It is advantageously also connected to the flight management system 14 and to the management and monitoring system 16.

It is suitable for querying a weather database 50 and/or a navigational information database 52, for example via a data network, in particular a wireless data network.

The weather database 50 contains current and predictive weather data in the navigation zone of the aircraft in a mission volume extending between the point of origin 18 and the point of destination 20. The mission volume preferably has a significant width, for example at least 700 nautical miles, on either side of the orthodromic trajectory 90 between the point of origin 18 and point of destination 20.

This weather data is provided at several flight levels, e.g. every 304 m (1,000 ft), at an altitude of e.g. 0 m to 15,545 m (51,000 ft).

Weather data is provided at altitude but also by providing a meteorological component that evolves over time. This scalable component is obtained using weather forecast data, which may include a plurality of weather maps at successive points in time (e.g. hourly).

These weather data include, among others, wind speed and direction, temperature, pressure, precipitation, dangerous phenomena (frost, thunderstorms/cumulonimbus), turbulence, tropopause level, volcanic ash clouds, dust/sand clouds, visibility, as well as aeronautical observations in the zone or on way (METARs, PIREPS) and forecasts in the zone (TAFs). They may comprise the definition and evolution over time and space of the geographical coordinates of dangerous weather zones 28 and/or zones of turbulence 30.

This weather data defines a weather context, preferably an evolving one, in the mission volume extending between the geographical point of origin 18 and the geographical point of destination 20.

The navigational information database 52 contains terrain information data at and between the point of origin 18 and the point of destination 20. Advantageously, the navigational information database 52 comprises an airport sub-database (runway lengths, runway orientation, slopes, etc.) and a navigation sub-database. In particular, the navigation data includes a network of waypoints 53A and the trajectories 53B imposed between the waypoints, as defined by the aviation authorities in each country (see FIG. 9).

Advantageously, it contains the definition of the geographical coordinates of forbidden zones and/or flight levels 24, in particular due to geopolitical data, and/or imposed air routes 26.

It may comprise the definition of Satellite Communications Coverage (SATCOM) zones 32.

The calculation engine 40 comprises at least one computer comprising at least one processor 54 and a memory 56. The memory 56 contains software modules suitable for execution by the processor 54. In one variant, the modules are implemented at least partially as programmable logic components or as dedicated integrated circuits.

In this example, the memory 56 contains a software module 58 for initialising mission specifications, suitable for acquiring operational specifications of the mission from the interface 42 in particular, and comprising a software module 60 for retrieving a weather context from the database 50, and a software module 62 for determining aircraft performance as a function of the mission specifications, the weather context and the aircraft context.

The memory 56 also contains a first software module 64 for calculating a first optimal mission trajectory 64A, as a function of the determined aircraft performance, the weather context and the mission specifications, the first calculation module 64 being suitable for calculating the first optimal mission trajectory 64A in a manner not constrained by a network of waypoints 53A and/or imposed trajectories 53B between the waypoints 53A.

Advantageously, with reference to FIG. 9, and as described for the system in U.S. Pub. No. 2020/0020237A1, which is hereby incorporated by reference herein, the memory 56 also contains a module 63 for defining, around the first optimal mission trajectory 64A, an optimisation region 63A of the optimal trajectory 64A and a second module 65 for calculating an optimised trajectory 65A of the aircraft in the optimisation region 63A, in a manner constrained by a network of waypoints 53A and/or imposed trajectories 53B between the waypoints 53A.

According to the present disclosure, the memory 56 also contains a module 67 for determining a level of risk of loss of optimality of the trajectory actually flown by the aircraft, associated with a trajectory modification with respect to the calculated trajectory, the calculated trajectory being the optimal trajectory 64A or, if applicable, the optimised trajectory 65A.

The initialisation module 58 is adapted to acquire the operational specifications of the mission from the interface 42, and/or from the management and monitoring system 16.

The retrieval module 60 is adapted to query the weather database 50 to obtain, in particular, wind speeds and directions in the mission volume extending between the point of origin 18 and the point of destination 20, at several flight levels.

The determination module 62 comprises an aircraft weight and balance software application 66 for determining the centre of gravity of the aircraft, a high-speed performance determination software application 68, and advantageously a low-speed performance determination software application 70.

The aircraft weight and balance application 66 is suitable for determining the position of the aircraft's Zero Fuel Weight Centre of Gravity and the aircraft's Zero Fuel Weight, based on the empty weight of the aircraft, the equipment on board the aircraft, the passengers and/or cargo on board, and their position in the aircraft, as well as monitoring the flight envelope of the aircraft (weight and balance diagram).

The high speed performance determination application 68 is adapted to determine the fuel weight to be carried in the aircraft on a given trajectory, for example an orthodromic trajectory or calculated trajectory between the point of origin 18 and the point of destination 20, using the position of the centre of gravity and the weight of the aircraft with no fuel in the aircraft (or "Zero Fuel Weight") determined by the application 66, a predetermined airspeed, for example entered or calculated from data entered by the user interface 42, the weather context retrieved from the module 60, in particular wind speeds and temperatures and possibly the aircraft context, for example the type and age of the engines, retrieved from the initialisation module 58.

The high speed performance determination application 68 further comprises functions for calculating instantaneous fuel consumption and variation in instantaneous aircraft weight over the course of a trajectory, advantageously using the position of the centre of gravity and the aircraft weight in the absence of fuel in the aircraft, a predetermined airspeed, for example entered or calculated from data entered by the user interface 42, the weather context retrieved from the module 60, in particular wind speeds and temperatures and possibly the aircraft context, for example the type and age of the engines, retrieved from the initialisation module 58.

The high-speed performance determination application 68 also comprises a function to determine achievable flight levels based on the predetermined airspeed, weather context, and possibly aircraft context.

These functions for calculating instantaneous consumption, variation in instantaneous aircraft weight and determination of achievable flight levels are suitable for being called by the calculation module 64 for calculating the iso-displacement curves.

The low-speed performance determination application 70 is adapted to determine in particular the maximum aircraft weight (and take-off card) allowing the aircraft to take off and/or land on a field, as a function of the runway length data retrieved from the database 52, and the weather context retrieved from the module 60.

Figure 2:
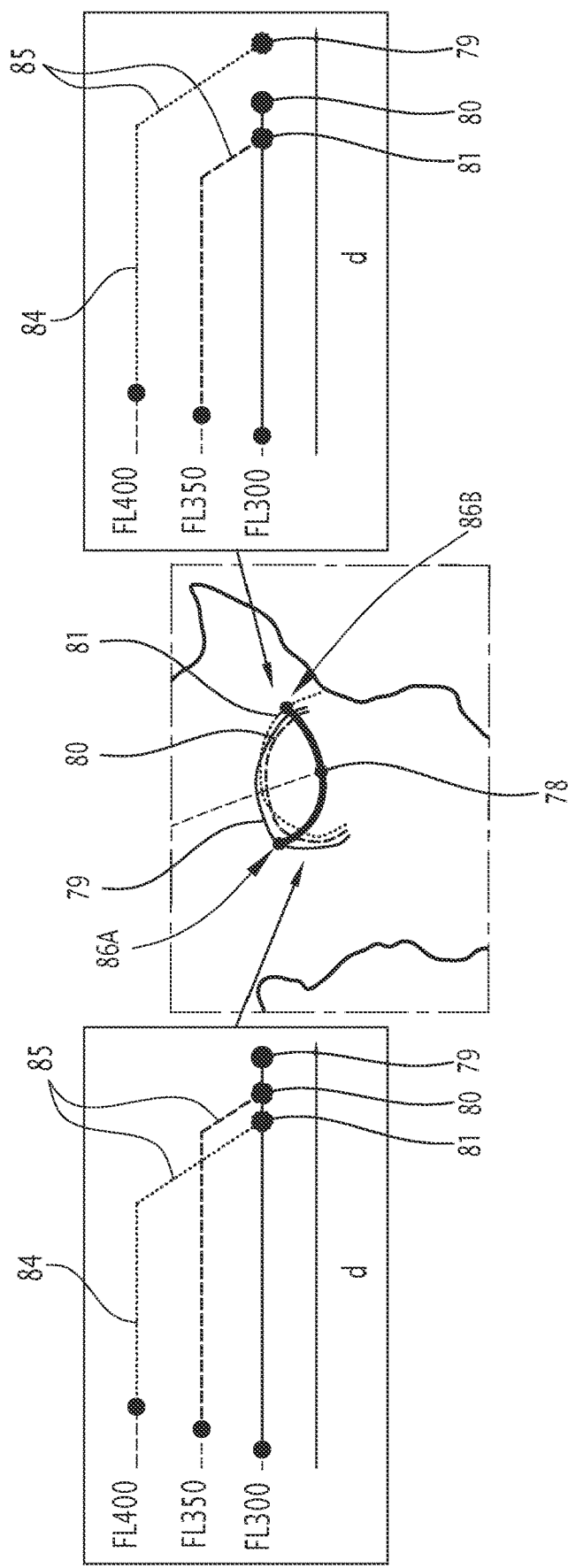
FIG. 2 is a view illustrating the principle of determining isochrones, and extended isochrones at different flight levels.

In an advantageous example, the first calculation module 64 is in accordance with that described in U.S. Pub. No. 2020/0302805A1, which is hereby incorporated by reference herein. With reference to FIG. 2, it is then configured to calculate, from at least one chosen point 78 accessible to the aircraft, a plurality of iso-displacement curves 79, 80, 81 each corresponding to a displacement of the aircraft at a distinct flight level (e.g. FL300, FL350, FL400), after one or more displacement increments. The number of levels is 3 in the example shown. In practice, the number of levels is greater than or equal to 2 and is for example between 2 and 20, advantageously between 6 and 20.

The first calculation module 64 is adapted to determine, on the basis of the iso-displacement curves 79, 80, 81 obtained at the same displacement interval corresponding to several displacement increments at different flight levels FL300, FL350, FL400, at least one extended iso-displacement curve 83, visible in FIG. 3, maximising the displacement performed from the geographical point of origin 18 or minimising the displacement to be performed up to the geographical point of destination 20.

The first calculation module 64 is further adapted to calculate at least one optimal trajectory 64A between the point of origin 18 and the point of destination 20 based on the extended iso-displacement curves 83.

The accessible point chosen is initially the geographical point of origin 18, as illustrated in FIG. 2. Alternatively, the accessible point chosen is an endpoint of ascent from the geographical point of origin 18.

Once at least one extended iso-displacement curve 83 has been obtained, each iso-displacement curve 79, 80, 81 is obtained from accessible points 78 on the extended iso-displacement curve 83.

In the example illustrated by the figures, the first calculation module 64 is able, starting from the geographical point of origin 18 or any point of an extended iso-displacement curve 83, to establish at least one iso-displacement curve 79, 80, 81 over a predetermined time increment starting from the chosen point, taking into account the chosen air speed, the weather context, the aircraft performance determined by the calculation functions of the application 68, and the operational specifications defined by the initialisation module 58.

With reference to FIG. 2, the iso-displacement curves 79, 80, 81 are obtained for a given flight level, here FL300, for level movements of the aircraft at departure flight levels FL300, FL350, FL400 equal to or distinct from the given flight level FL300 from an accessible point here located on an iso-displacement curve 83 of the respective departure flight level FL300, FL350, FL400.

Thus, on the left of FIG. 2, the iso-displacement curve 79 is obtained by evolving the aircraft at a constant level corresponding to the given flight level FL300, from an accessible point 78 on the extended iso-displacement curve 83 at the starting flight level FL300 which corresponds to the given flight level FL300.

Iso-displacement curves 80 and 81 are obtained by performing a phase 84 of level flight at a departure flight level FL350, FL400 distinct from the given flight level FL300, starting from the iso-displacement curve 83 at the respective departure flight level FL350, FL400, followed by a phase 85 of attaining the given flight level FL300.

The attainment phase 85 comprises for example a climb or descent along a predetermined profile, for example at constant slope, constant True Air Speed or constant Mach to reach the given flight level FL300 from level flight at a flight level FL350, FL400 distinct from the given flight level FL300.

Advantageously, for a given travel interval corresponding to several travel increments, the calculation module 64 is adapted to determine an intermediate increment from which the attainment phase 85 starts, by determining for example the time required to reach the given flight level FL300 from the respective starting flight level FL350, FL400.

This intermediate increment is determined as a function of the flight profile predetermined in phase 85, taking into account the chosen airspeed, the weather context, the aircraft performance determined by the calculation functions of applications 66 and 68, and the operational specifications defined by the initialisation module 58.

The calculation module 64 is then adapted to determine an intermediate iso-displacement curve, at the intermediate increment, for level flight at the starting flight level FL350, FL400, and then to define the iso-displacement curves 80, 81 at the given flight level FL300 from the attainment phase 85, at the displacement interval, from the previously defined intermediate iso-displacement curve.

As illustrated in FIG. 2, the extended iso-displacement curve 83 is obtained by superimposing the obtained iso-displacement curves 79, 80, 81 at the same displacement interval and then determining the location of the points on the iso-displacement curves 79, 80, 81 maximising the distance travelled from the geographical starting point 18 or minimising the distance to be travelled to the geographical end point 20.

Thus, in a first direction, at left in FIG. 2, the point 86A furthest from the selected point 18 is located on the iso-displacement curve 79 corresponding to level flight at the given flight level FL300. Instead, in the direction at right in FIG. 2, the point 86B furthest from the selected point 18 is a point on the iso-displacement curve 81 corresponding to the aircraft displacement at a flight level FL400 distinct from the given flight level FL300, and then descending along the predetermined profile towards the given flight level FL300.

The points 86A, 86B of the extended iso-displacement curve 83 thus formed are thus advantageously located on several iso-displacement curves 79, 80, 81 to maximise the total distance travelled from the geographical point of origin 18 or to minimise the total distance to the geographical point of destination 20.

The first calculation module 64 is adapted to selectively exclude points which are located in forbidden flight zones or levels 24, dangerous weather zones 28 and/or turbulence zones 30. The calculation module 24 is able to also exclude points which are not located in a satellite coverage zone 32.

Figure 4:
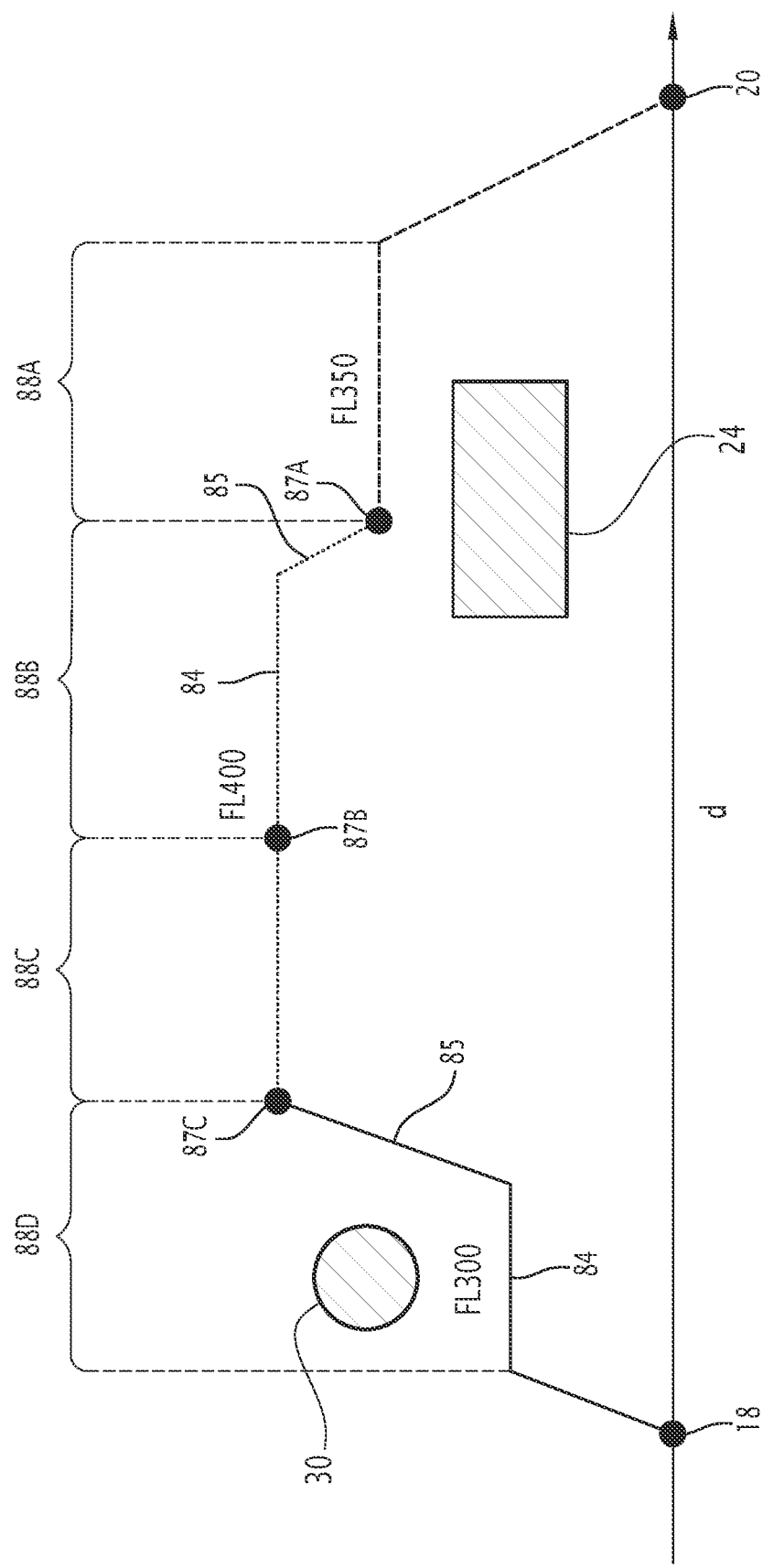
FIG. 4 is a view showing the vertical profile that can be obtained for a calculated trajectory.

The avoidances of the defined four-dimensional zones are shown in FIG. 4, for example, in cross-section in the vertical plane.

As seen in FIG. 3, the first calculation module 64 is adapted to determine a plurality of successive extended iso-displacement curves 83, obtained at successive time intervals, from iso-displacement curves 79, 80, 81 each corresponding to one or more time increments within each displacement interval.

Advantageously, as shown in FIG. 3, the first calculation module 64 is adapted to determine the successive extended iso-displacement curves 83 at a plurality of flight levels FL300, FL350, FL400.

The first calculation module 64 is suitable for choosing an optimal trajectory 64A based on the calculated extended iso-displacement curves 83.

With reference to FIG. 3, the first calculation module 64 is adapted to determine each point of the optimal trajectory 64A in a manner unconstrained by a network of waypoints 53A and/or imposed trajectories 53B between the waypoints 53A.

Thus, the determination of the optimal trajectory 64A by the first calculation module 64 is implemented as if the aircraft were capable of free flight taking into account the mission specifications, but without taking into account the network of waypoints 53A and/or trajectories 53B imposed between the waypoints 53A that are defined by the air traffic control authorities.

With reference to FIG. 3, the optimum trajectory 64A is preferably determined from the geographical point of destination 20, or from a descent start point, to the point 20, by ascending the iso-displacement curves 80 at the final flight level FL350 that first reached the geographical point of destination 20 or descent start point, to the point 87A on the extended iso-displacement curve 83 corresponding to the last displacement interval consisting of several iso-displacement increments. This defines a first trajectory section 88A.

Point 87A on the extended iso-displacement curve 83 corresponds to a point on an iso-displacement curve 79, 80, 81 which results either from level flight at the same flight level as the final flight level FL350, or from a phase 84 of level flight at a flight level FL300, FL400 different from the final flight level FL350 and a phase 85 of reaching the final flight level.

In the second case, shown on the right in FIG. 3, the iso-displacement curves 81 at a separate flight level FL400 are then traced back to point 87B of the extended iso-displacement curve 83 adjacent to the same flight level FL400 from which point 87A was obtained. This defines a second trajectory section 88B.

In the first case, shown as point 87B in FIG. 3, the iso-displacement curves 80 at the same flight level FL400 are traced back to point 87C of the extended iso-displacement curve 83 adjacent to the same flight level FL400 from which point 87B was obtained. This defines a third trajectory section 88C. The point 87C was obtained here from a level flight phase 84 at FL300 followed by an ascent phase 85 at FL400.

This mechanism is repeated until the geographical point of origin 18 is reached, as shown on the left in FIG. 3.

The first calculation module 64 is able to define an optimal trajectory 64A not only in the horizontal plane, but also in the vertical plane.

The trajectory profile in the vertical plane is illustrated in FIG. 4 and comprises a plurality of trajectory sections 88A to 88D. Each trajectory section 88A, 88B, 88C is determined from or/and from an extended iso-displacement curve 83, and comprises either a single level phase 84, or a level phase 84, and a phase 85 of reaching another level.

Figure 6:
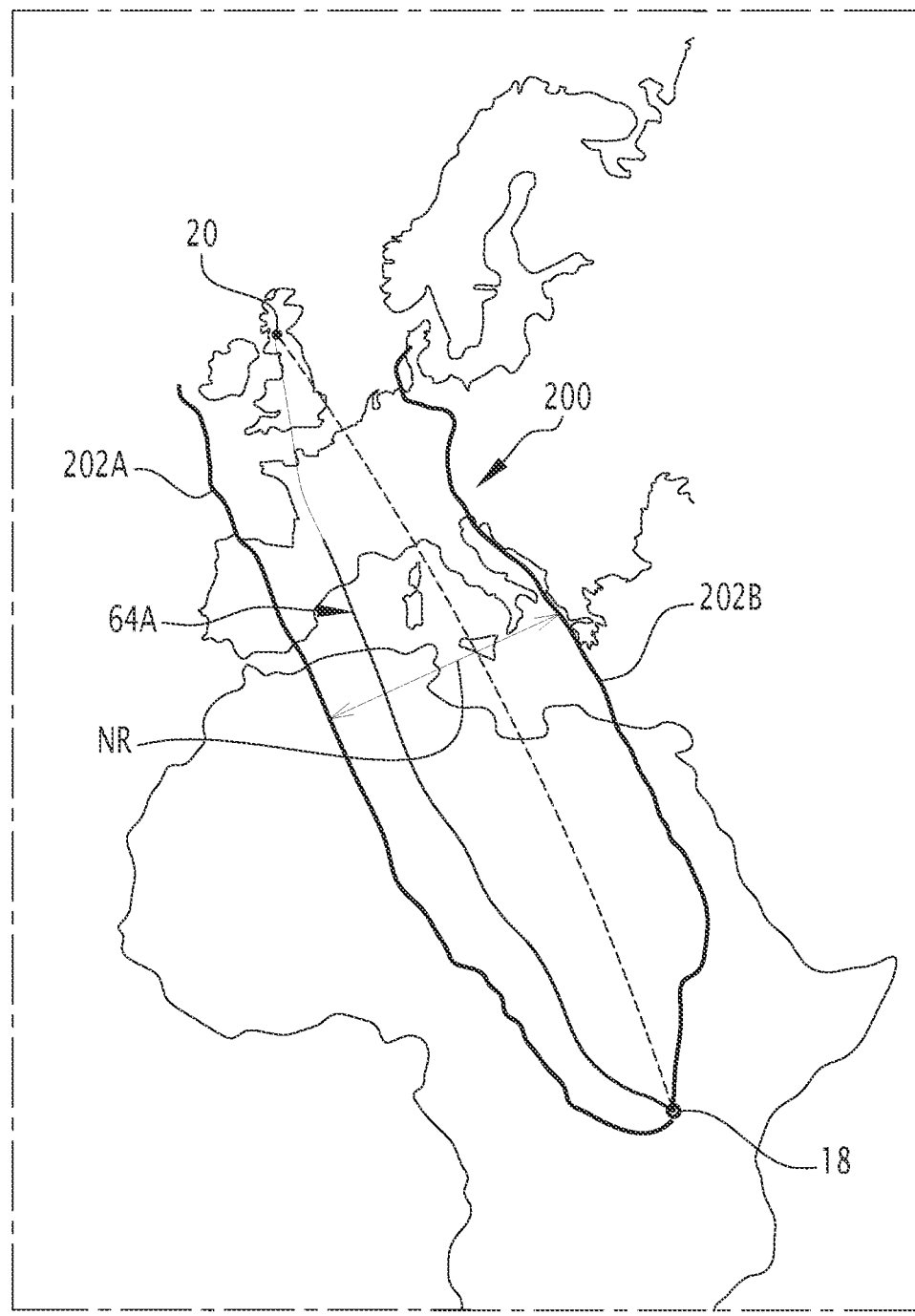
FIG. 6 illustrates the definition of a risk level determination sock projected in a horizontal plane.

The profile of the trajectory 64A in the horizontal plane is shown in FIG. 6, superimposed on a topographical representation of the environment in which the aircraft is evolving.

In the example just described, the iso-displacement curves are advantageously isochronous curves. By definition, an isochronous curve is a curve connecting the points accessible to the aircraft from a given point (which may be the origin 18 or a point on an isochronous curve) in a given time which corresponds to one or more time increments. Each time increment is for example between 1 minute and 1 hour, in particular between 2 minutes and 10 minutes, for example 5 minutes.

In this example, each isochronous curve is determined from a given point accessible to the aircraft by calculating from the given point all points accessible to the aircraft, at a given airspeed, taking into account the weather context, in particular the wind direction and intensity, as provided by the retrieval module 60 and the aircraft performance, as determined by the calculation functions of the application 68.

Advantageously, the calculation module 64 is able to calculate a succession of isochronous curves 79, 80, 81 at several flight legs, and extended isochronous curves 83 from the isochronous curves 79, 80, 81 obtained for a single time interval.

With reference to FIG. 9, when present, the definition module 63 is advantageously adapted to define the optimisation region 63A of the trajectory as a function of a predetermined lateral distance to each point of the optimal trajectory 64A defined by the first calculation module 64 and as a function of the mission operational specifications, in particular the mission context, in particular navigation constraints, weather constraints and passenger comfort constraints.

Advantageously, the definition module 63 is adapted to laterally delimit the optimisation region 63A of the trajectory 64A by lateral limits extending laterally at a distance chosen as a function of the density of the air network of each point of the optimal trajectory 64A.

This chosen distance is generally less than 1,852 km (1,000 nautical miles or "nm") and can be between 185 km (100 nm) and 926 km (500 nm) in a low-density network, for example in Africa, and between 183 km (99 nm) and 55 km (30 nm) in a high-density network such as in Europe.

Thus, the optimisation region 63A is generally defined by a band encompassing the trajectory 64A. The band is potentially also constrained by forbidden zones 24, dangerous weather zones 28 and/or turbulence zones 30. It encompasses satellite coverage zones 32 as appropriate.

The second calculation module 65 of trajectories 65A, when present, comprises an application 92 for defining a network of nodes between the geographical point of origin 18 and the geographical point of destination 20 from the network of waypoints 53A and/or trajectories 53B imposed between the waypoints 53A, and an application 93 for defining a cost associated with going from one node to an adjacent node among the nodes of the network.

The second calculation module 65 also comprises an application 98 for determining the optimised trajectory 65A in the network of nodes based on a minimisation of the total cumulative cost between the geographical point of origin 18 and the geographical point of destination 20.

The definition application 92 is adapted to load the coordinates of waypoints 53A and imposed trajectories 53B between the waypoints 53A from the database 52 within the optimisation region 63A.

The definition application 92 is able to define, among the waypoints 53A, the nodes which are the possible waypoints 53A for the aircraft, notably taking into account the mission constraints, in particular the navigation constraints, the weather constraints and the passenger comfort constraints, as defined above.

The definition application 93 is adapted to define the cost associated with the passage between two adjacent nodes based on the geographical distance separating the two nodes and also on the weather context retrieved from the module 60, in particular on the evolving weather context and possibly on the aircraft context, for example the type and age of the engines, retrieved from the initialization module 58.

The optimised trajectory 65A determination application 98 is adapted to implement a cost minimisation algorithm to define the least costly trajectory in the optimisation region 63A through the nodes and through the imposed trajectories between the nodes from the geographical point of origin 18 to the geographical point of destination 20.

The algorithm is for example Dijkstra's algorithm and/or an A* algorithm. Dijkstra's algorithm takes as input the weighted network defined above between the geographical point of origin 18 and the geographical point of destination 20.

A description of the use of Dijkstra's algorithm is given in U.S. Pub. No. 2020/0020237A1.

A description of the A* algorithm is, for example, given in the article that can be downloaded at https://en.wikipedia.org/wiki/A*_search_algorithm.

Once the optimised trajectory 65A is obtained, the calculation engine 40 is advantageously able to determine at least one mission parameter of the aircraft corresponding to the optimised trajectory 65A.

The mission parameter is for example a total take-off weight of the aircraft. This take-off weight is calculated at each iteration by the calculation module 64 and then by the calculation module 65, based on the estimated consumption on the trajectory between the point of origin 18 and the point of destination 20, calculated using the functions for calculating the instantaneous fuel consumption and the variation of the instantaneous aircraft weight, and based on a passenger and freight load predefined in the operational specifications.

The calculation engine 40 is then adapted to perform calculation iterations by using the modules 64, 65 in succession, by determining, in each iteration, a new optimal trajectory 64A using the first calculation module 64 by calculating new extended iso-displacement curves 83, a new optimisation region 63A using the determination module 63, then a new optimised trajectory 65A using the second calculation module 65, until convergence onto the value of the mission parameter is achieved.

Once convergence has been obtained, the mission engine 40 is able to check the coherence of the high-speed performance using the application 66. The mission engine 40 is adapted to verify in particular that the take-off weight obtained using the calculation modules 64, 65 after convergence is less than or equal to the maximum weight allowing the aircraft to take off obtained using the low speed application 70 to ensure that the aircraft will be able to take off on the field chosen for the take-off.

Once the final optimised trajectory 65A is obtained, the second calculation module 65 provides a data file comprising a list of waypoints 53A, and a list of trajectories 53B between the waypoints 53A.

The data file provided by the second calculation module 65 advantageously further comprises a list of headings TCA between the waypoints 53A, a list of distances DST between the waypoints 53A, a list of wind components COMP between the waypoints 53A, a list of true speeds TAS between the waypoints 53A, a list of ground speeds GS between the waypoints 53A, a list of static air temperatures SAT between the waypoints 53A, a list of turbulence levels SHR between the waypoints 53A, a list of estimated arrival times ETA at a waypoint 53A, and a list of estimated on way times EET.

This data file is suitable for retrieval by the crew and/or for loading by manual entry or data transfer into the flight management system 14 for use during the flight.

According to the present disclosure, the determination module 67 is adapted to evaluate a level of risk of loss of optimality of the trajectory actually followed by the aircraft, if the aircraft changed its trajectory from the calculated trajectory, this calculated trajectory being the optimal trajectory 64A or the optimised trajectory 65A.

Preferably, the determination module 67 is adapted to determine the risk level for a plurality of points of the calculated trajectory. For example, the risk level is determined at least for each point of the calculated trajectory present on an iso-displacement curve 79, 80, 81 of each trajectory section 88A, 88B, 88C.

Advantageously, the determination module 67 is adapted to establish a sock 200 around the calculated trajectory, the sock 200 including the calculated trajectory, the level of risk being given by the distance between the calculated trajectory and the edges 202A, 202B of the sock 200.

Figure 5:
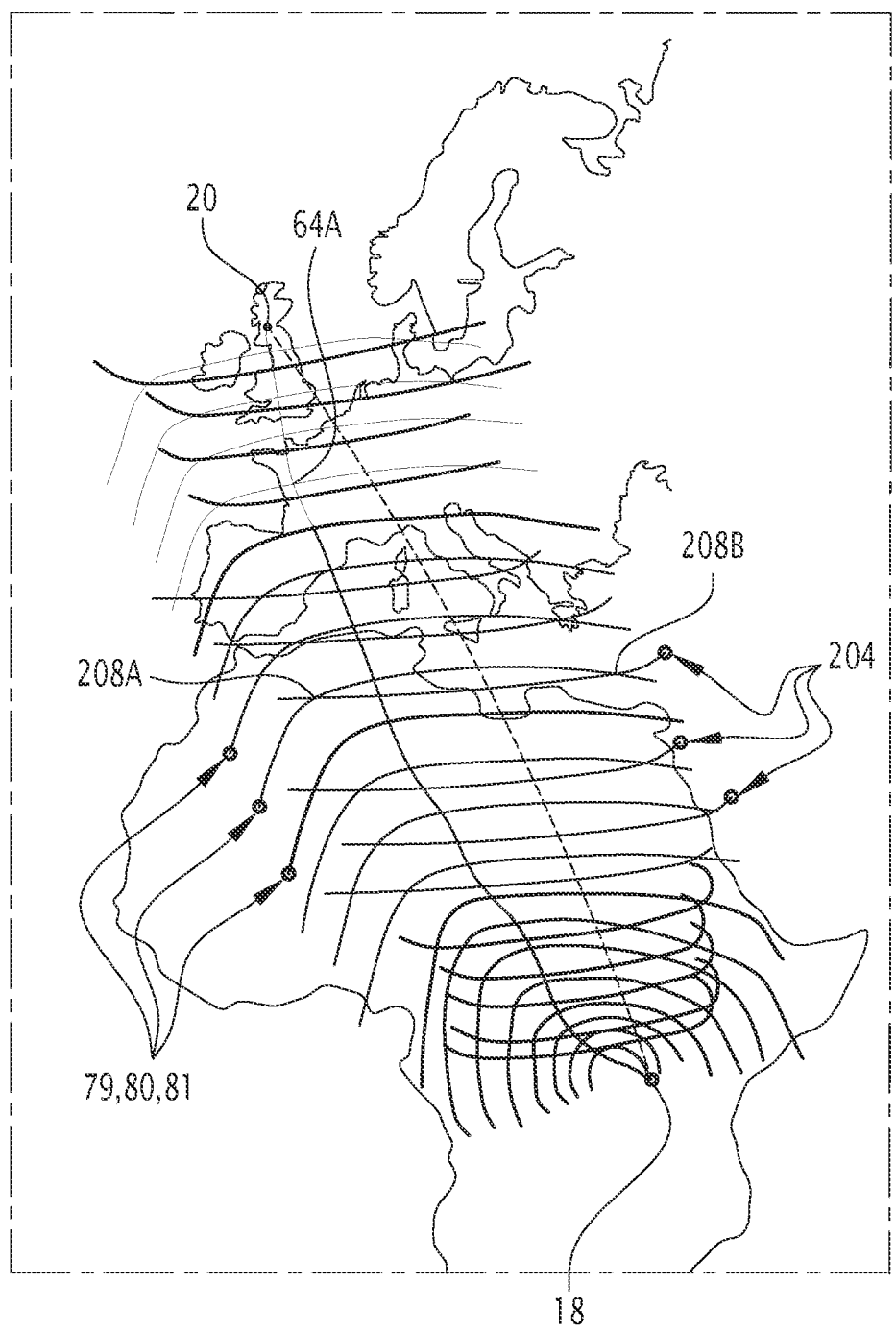
FIG. 5 is a view similar to FIG. 3 illustrating the principle of obtaining inverse isochronous curves from the geographical point of destination to the geographical point of origin by following the calculated trajectory of FIG. 4.

In a first example, visible in FIGS. 5 and 6, the sock 200 is determined in projection in a horizontal plane, the risk level NR being given by the transverse distance between the trajectory 64A and the side edges 202A, 202B of the sock 200.

As illustrated in FIG. 5, the determination module 67 is adapted to establish the sock 200 by calculating inverse iso-displacement curves 204 from the destination geographical point 20 to the origin geographical point 18, imposing the same flight levels as those of the vertical profile of the calculated trajectory 64A, as seen in FIG. 4. These flight levels correspond to those of the iso-displacement curves 79, 80, 81 that were used to determine points 87A, 87B, 87C of the trajectory 64A.

Thus, the inverse iso-displacement curves 204 follow the vertical profile of the calculated trajectory 64A, but starting from the geographical point of destination 20 instead of the geographical point of origin 18 and arriving at the geographical point of origin 18 instead of the geographical point of destination 20.

The inverse iso-displacement curves 204 are obtained at the same displacement increments (e.g. at the same time increments in the case of isochronous curves) as the displacement increments used to calculate the iso-displacement curves 79, 80, 81.

The determination module 67 is adapted to obtain the position of the lateral edges 202A, 202B of the sock 200 by the intersection 208A, 208B between at least one iso-displacement curve 79, 80, 81 containing a point of the trajectory 64A and at least one inverse iso-displacement curve 204 corresponding to this iso-displacement curve 79, 80, 81.

When the iso-displacement curve 79, 80, 81 containing a point of the trajectory 64A is obtained after a number N1 of displacement increments, the inverse iso-displacement curve 204 used by the determination 67 module to obtain the intersection 208A, 208B is the one corresponding to a number N2 of displacement increments calculated by the equation:

$$N2=N-N1+1$$

where N is the total number of displacement increments required to connect the geographical point of origin 18 to the geographical point of destination 20 along the calculated trajectory.

In the case of isochronous curves, when the iso-displacement curve 79, 80, 81 containing a point of the trajectory 64A is obtained after a time T1 (corresponding to N1 time increments), the inverse iso-displacement curve 204 used by the determination module 67 to obtain the intersection 208A, 208B is that corresponding to a time T2 corresponding to the difference between the total time T for connecting the geographical point of origin 18 to the geographical point of destination 20 along the trajectory 64A (corresponding to N time increments), and the time T1, plus the time corresponding to a displacement increment between two successive isochronous curves 79, 80, 81.

Each intersection 208A, 208B thus comprises two points located on either side of the trajectory 64A.

The lateral edges 202A, 202B of the sock 200 are then obtained by joining respectively the intersection points 208A present on a first side of the trajectory 64A and the intersection points 208B on a second side of the trajectory.

The level of risk of loss of optimality of the actual mission flown, associated with a trajectory change from the calculated trajectory 64A is then defined as the transverse extent of the sock 200.

For example, the risk level is determined for each point on the calculated trajectory 64A as the transverse extent of the sock 200 calculated from the point on the trajectory 64A, perpendicular to the local tangent to the trajectory 64A.

The greater the cross-sectional extent of the sock 200, the more the risk that the actual mission characteristics flown will deviate from the optimum calculated by flying the trajectory 64A is low when the crew makes a trajectory change from the calculated trajectory 64A.

The lower the cross-sectional extent of the sock 200, the more the risk that the actual mission characteristics flown will deviate from the optimum calculated by flying the trajectory 64A is high ("cliff effect") when the crew makes a trajectory change from the calculated trajectory 64A.

In the case of isochronous curves, the difference in arrival time at the geographical point of destination 20 compared to the estimated arrival time by implementing the trajectory 64A is advantageously less than a time increment of the isochronous curves, when the trajectory change with respect to the trajectory 64A remains confined in the sock 200.

Conversely, this difference in arrival time at the geographical point of destination 20 compared to the estimated arrival time by implementing the trajectory 64A is necessarily greater than a time increment of the isochronous curves, when the trajectory change with respect to the trajectory 64A exits the sock 200.

By definition, each point within the sock 200 is reachable via a trajectory whose time difference quoted above is less than one time increment of the isochronous curves.

In addition to the projection of the sock 200 in a horizontal plane, the determination module 67 is advantageously adapted to determine a vertical projection of the sock 200 in a vertical plane, the level of risk being given by the vertical distance between the trajectory 64A and the upper and lower edges 209A, 209B of the sock 200.

Figure 7:
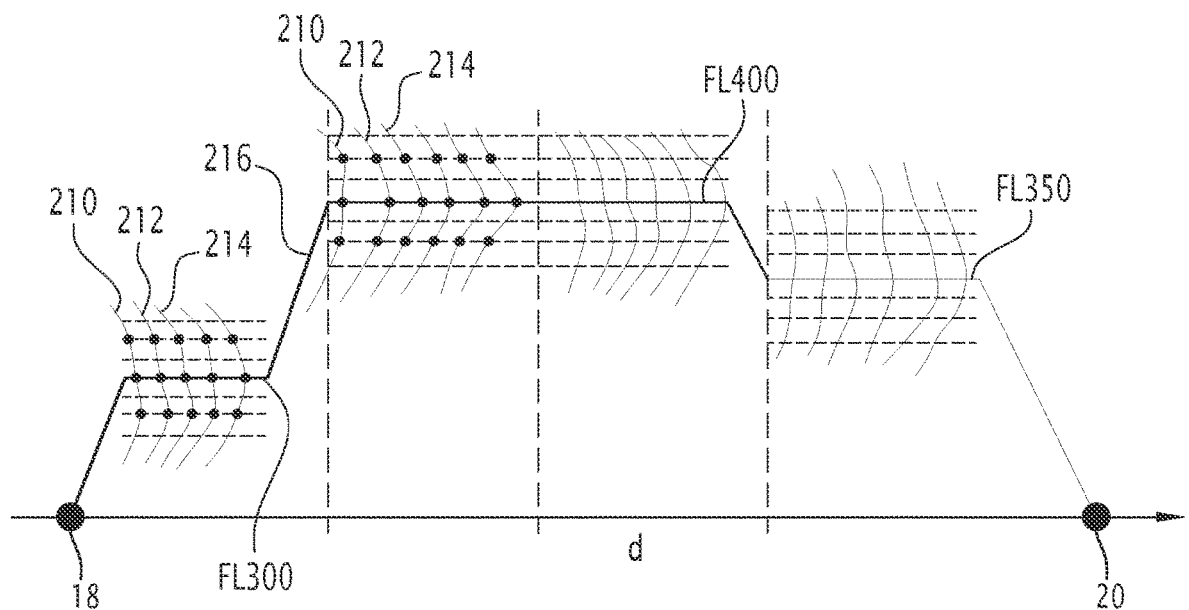
FIG. 7 illustrates the principle of obtaining vertical isochrones at different flight levels from the trajectory in FIG. 4.

Advantageously, for the determination of the upper and lower edges 209A, 209B, as illustrated in FIG. 7, the calculation module 64 is adapted to determine vertical iso-displacement curves 210, 212, 214 in a vertical plane, around the vertical profile 216 of the calculated trajectory 64A.

Advantageously, the calculation module 64 is configured to calculate, from at least one selected point 18 accessible to the aircraft, each vertical iso-displacement curve 210, 212, 214. The points of each vertical iso-displacement curve correspond to a displacement of the aircraft at distinct flight levels (e.g. FL300, FL350, FL400), after an increment of displacement with respect to another vertical iso-displacement curve 210, 212, 214 along the already determined horizontal trajectory.

To obtain a point on the vertical iso-displacement curve 212 corresponding to the same flight level FL300 as a point on a previous iso-displacement curve 210, the calculation module 64 performs the calculation by holding the aircraft at a constant level corresponding to the given flight level FL300.

To obtain a point on the vertical iso-displacement curve 210 corresponding to another flight level FL350, FL400 than the flight level FL300 of a point on a previous iso-displacement curve, the calculation module 64 implements the calculation so that the aircraft performs a phase of reaching the other flight level FL350, FL400 followed by a phase of level flight at the other flight level FL350, FL400.

The generation of iso-displacement curves in the vertical plane uses the sections defined between two extended iso-displacement curves 83 when constructing the optimal trajectory in the horizontal plane. The iso-displacement curves within a section (curves 212, 213, 214 . . . ) are obtained by flying level from the corresponding point of the previous iso-displacement curve (respectively 210, 212, 213 . . . ) for each flight level attainable by the aircraft.

When a section is changed, the vertical iso-displacement curve is calculated from the last iso-displacement curve of the previous section, with the possibility of changing or not changing the flight level.

As before, the determination module 67 is adapted to establish the sock 200 by calculating vertical inverse iso-displacement curves 218 from the destination geographic point 20 to the origin geographic point 18 in accordance with the method described above for the vertical iso-displacement curves 210, 212, 214 along the previously defined horizontal trajectory.

Figure 8:
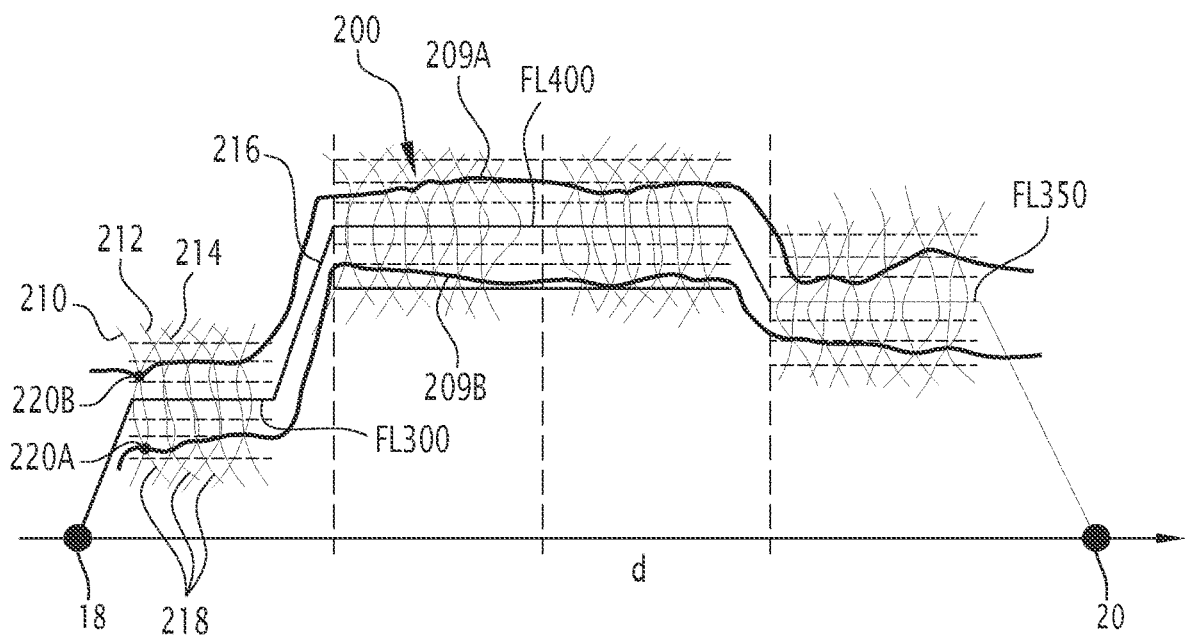
FIG. 8 is a view similar to FIG. 7 illustrating the principle of obtaining vertical inverse isochrones and the determination sock in projection in a vertical plane.

With reference to FIG. 8, the determination module 67 is adapted to obtain the position of the upper and lower edges 209A, 209B of the sock 200 by the intersection 220A, 220B between at least one vertical iso-displacement curve 210, 212, 214 containing a point of the trajectory 64A and at least one vertical inverse iso-displacement curve 218 corresponding to this iso-displacement curve 210, 212, 214.

When the vertical iso-displacement curve 210, 210, 214 containing a point of the trajectory 64A is obtained after a number N1 of displacement increments, the vertical inverse iso-displacement curve 218 used by the determination 67 module to obtain the intersection 220A, 220B is the one corresponding to a number N2 of displacement increments calculated by the equation:

$$N2 = N - N1 + 1$$

where N is the total number of displacement increments required to connect the geographical point of origin 18 to the geographical point of destination 20 along the calculated trajectory.

The top and bottom edges 209A, 209B of the sock 200 are then obtained by respectively connecting the intersection points 208A present above the trajectory 64A and the intersection points 208B present below the trajectory 64A.

As illustrated in FIG. 6, the display manager 44A is adapted to display on the display system 44, superimposed on a topographical representation of the environment in which the aircraft is flying, the trajectory 64A, 65A calculated in horizontal projection and around this calculated trajectory 64A, 65A, a representation of the sock 200 with its lateral edges 202A, 202B.

This representation of the sock 200 provides to the crew an indicator of the level of risk that the characteristics of the actual mission flown will be far from the optimal calculated by flying the trajectory 64A, associated with a trajectory change from the calculated trajectory 64A, 65A.

Indeed, the crew can directly assess, according to the width of the sock 200 at a given point of the trajectory 64A, 65A, whether the envisaged or imposed trajectory modification is likely to lead to no longer complying with the operational specifications, for example in terms of estimated arrival time and/or fuel consumed. In particular, when the sock 200 is narrow in a particular region, the crew is aware that any alteration in trajectory may have a significant impact on compliance with operational specifications.

Advantageously, the display manager 44A is adapted to display on the display system 44, superimposed on a topographical representation of the environment in which the aircraft is evolving, the trajectory 64A, 65A calculated in vertical projection and around this calculated trajectory 64A, 65A, a representation of the sock 200 with its upper and lower edges 209A, 209B.

A method for calculating a mission, implemented using the system 10 according to the present disclosure, will now be described.

This method is used, for example, when preparing the mission, to establish its feasibility, to more accurately prepare the mission, or to take into account a last-minute change in an already-prepared mission.

Alternatively, this method is implemented during the monitoring of the mission, or to test hypotheses for modifying the mission, to optimise it, or to reconfigure it.

Initially, the user, including the crew, enters at least some of the operational specifications using the configuration interface 42. The user defines, for example, for each leg of the mission, the geographical point of origin 18, the geographical point of destination 20 and possibly a number of passengers to be transported, a desired air speed, a departure time and/or a fixed arrival time, a maximum distance to be covered.

Then, when he wants to define a possible trajectory, he activates the calculation engine 40. The initialisation module 58 retrieves the operational specifications from the interface 42 to obtain all the information on each leg of the mission.

Advantageously, the initialisation module 58 retrieves further operational specifications from the aircraft's management and tracking system 16.

This step initializes the operational specifications related to the mission context and the aircraft context, e.g. the presence of failures or dispatches. This step also initializes the operational specifications for passenger comfort, including connectivity and turbulence levels. This step of specifying acceptable weather data is advantageously done at the user interface 42.

The initialization is advantageously done by considering a purely orthodromic trajectory in a standard atmosphere ("perfect" flight data).

Then, the weather context retrieval module 60 queries the weather database 50 to obtain, in particular, the wind speeds and directions between the point of origin 18 and the point of destination 20, at several flight levels.

The aircraft performance module 62 is then activated. The weight and balance application 66 determines the weight of the aircraft and the position of the centre of gravity of the aircraft in the absence of fuel in the aircraft ("Zero Fuel Weight" and "Zero Fuel Weight Centre of Gravity"), based on the empty weight of the aircraft, the equipment on board the aircraft, the passengers and/or the cargo on board, and their position in the aircraft.

On this basis, based on the weather context retrieved by the retrieval module 60, based on the aircraft context retrieved from the initialisation module 58, and based on the desired airspeed, the high-speed performance determination application 68 determines an initial trajectory of the aircraft and the associated aircraft fuel consumption using the centre of gravity position determined by the application 66.

The application 68 then calculates all the mission parameters, in particular the route, the arrival time, the flight profile and the fuel consumption, which makes it possible to deduce the take-off weight.

The first calculation module 64 then calculates, from at least one chosen point 78 accessible to the aircraft, a plurality of iso-displacement curves 79, 80, 81 each corresponding to a displacement of the aircraft at a distinct flight level (e.g. FL300, FL350, FL400), after one or more displacement increments.

Advantageously, as described in U.S. Pub. No. 2020/0302805A1, the first calculation module 64 then determines on the basis of the iso-displacement curves 79, 80, 81 obtained at a same displacement interval corresponding to several displacement increments at different flight levels FL300, FL350, FL400, at least one extended iso-displacement curve 83, maximising the displacement made from the geographical point of origin 18 or minimising the displacement to be made towards the geographical point of destination 20.

The first calculation module 64 then calculates at least one optimal trajectory 64A between the point of origin 18 and the point of destination 20 on the basis of iso-displacement curves 79, 80, 81 and possibly on the basis of extended iso-displacement curves 83.

The first calculation module 64 establishes at least each iso-displacement curve 79, 80, 81 over a predetermined time increment from the chosen point, taking into account the chosen airspeed, the weather context, the aircraft performance determined by the functions for calculating instantaneous fuel consumption and variation in instantaneous aircraft weight and for determining achievable flight levels described above, and the operational specifications defined by the initialisation module 58.

The first calculation module 64 is adapted to selectively exclude points which are located in forbidden flight zones or levels 24, dangerous weather zones 28 and/or turbulence zones 30. The calculation module 24 is able to also exclude points which are not located in a satellite coverage zone 32.

The first calculation module 64 determines each point of the optimal trajectory 64A in a manner unconstrained by a network of waypoints 53A and/or imposed trajectories 53B between the waypoints 53A.

With reference to FIG. 3, the optimum trajectory 64A is preferably determined from the geographical point of destination 20, or from a descent start point, to the point 20, by ascending the iso-displacement curves 80 at the final flight level FL350 that first reached the geographical point of destination 20 or descent start point, to the point 87A on the extended iso-displacement curve 83 corresponding to the last travel interval consisting of several iso-displacement increments. This defines a first trajectory section 88A.

The optimal trajectory 64A and the corresponding take-off weight of the aircraft are obtained.

In this example, iso-displacement curves 79, 80, 81 are isochronous curves as defined above. Each time increment is for example between 1 minute and 1 hour, in particular between 2 minutes and 10 minutes, for example 5 minutes. Each time interval between two extended iso-displacement curves 83 is then advantageously defined by at least three time increments, in particular by between 4 and 20 time increments.

As mentioned above, the optimal trajectory 64A is obtained at each iteration in a manner unconstrained by the network of waypoints 53A and/or trajectories 53B imposed between the waypoints 53A.

Eventually, at each iteration, as illustrated in FIG. 9, the definition module 63 advantageously defines the optimisation region 63A of the trajectory around the optimal trajectory 64A as a function of a predetermined lateral distance to each point of the optimal trajectory 64A defined by the first calculation module 64 and as a function of the mission operational specifications, in particular of the mission context, in particular of the navigational constraints, the weather constraints, and the passenger comfort constraints.

Advantageously, the definition module 63 laterally delimits the optimisation region 63A of the trajectory 64A by lateral limits extending laterally at a distance chosen as a function of the density of the air network of each point of the optimal trajectory 64A.

Then, as illustrated in FIG. 10, the definition application 92 loads the coordinates of waypoints 53A and imposed trajectories 53B between the waypoints 53A from the database 52 within the optimisation region 63A.

The definition application 92 defines among the waypoints 53A, the nodes 96 which are the possible waypoints 53A for the aircraft, notably taking into account the mission constraints, in particular the navigation constraints, the weather constraints and the passenger comfort constraints.

The definition application 93 defines the cost associated with the passage between two adjacent nodes 96 based on the geographical distance separating the two nodes 96 and also on the weather context retrieved from the module 60 and possibly on the aircraft context, for example the type and age of the engines, retrieved from the initialisation module 58.

The optimised trajectory 65A determination application 98 then implements a cost minimisation algorithm to define the least costly trajectory through the nodes 96 and through the imposed trajectories between the nodes 96 from the geographical point of origin 18 to the geographical point of destination 20. This algorithm is, for example, Dijkstra's algorithm. An optimised trajectory 65A is then obtained by minimising the cost, as described in U.S. Pat. No. 1,800,734.

The optimised trajectory 65A obtained at each iteration is constrained by a network of waypoints 53A and imposed trajectories 53B between the waypoints 53A in the air network.

The calculation engine 40 then calculates the set of mission parameters based on the optimised trajectory 65A obtained in the current iteration, and determines the difference between the mission parameter to be optimised (e.g. the take-off weight) for the initial trajectory and the mission parameter to be optimised for the optimised trajectory 65A.

The calculation engine then performs new trajectory calculations 64A, 65A, as described above, using the iso-displacement curves, until the mission parameter, in this case the take-off weight, converges to a desired mission parameter value.

Convergence is determined, for example, when the difference between the value of the mission parameter for the trajectory determined in the previous iteration and that determined in the current iteration is less than a predetermined value.

In particular, in the case of take-off weight, the difference between the take-off weight for the trajectory determined in the previous iteration and that determined in the current iteration must be less than a predetermined weight, for example 100 pounds.

Alternatively, the mission parameter is the landing weight or the distance travelled along the trajectory.

Advantageously, after convergence, the mission engine 40 checks the consistency of the high-speed performance using the application 66.

The mission engine 40 verifies in particular that the take-off weight obtained using the calculation modules 64, 65 after convergence is less than or equal to the maximum weight allowing the aircraft to take off obtained using the low speed application 70 to ensure that the aircraft will be able to take off on the field chosen for the take-off.

According to the present disclosure, the determination module 67 evaluates a level of risk of loss of optimality of the trajectory actually flown by the aircraft, if the aircraft changed its trajectory from the calculated trajectory, this calculated trajectory being the optimal trajectory 64A or the optimised trajectory 65A.

Preferably, the determination module 67 determines the risk level for a plurality of points of the calculated trajectory. For example, the risk level is determined at least for each point of the calculated trajectory present on an iso-displacement curve 79, 80, 81 of each trajectory section 88A, 88B, 88C.

Advantageously, the determination module 67 establishes a sock 200 around the calculated trajectory, the sock 200 including the calculated trajectory.

In a first example, visible in FIGS. 5 and 6, the sock 200 is determined in projection in a horizontal plane, the risk level NR being given by the transverse distance between the trajectory 64A and the side edges 202A, 202B of the sock 200.

As illustrated in FIG. 5, the determination module 67 establishes the sock 200 by calculating inverse iso-displacement curves 204 from the destination geographical point 20 to the origin geographical point 18, imposing the same flight levels as those of the vertical profile of the calculated trajectory 64A, as seen in FIG. 4. These flight levels correspond to those of the iso-displacement curves 79, 80, 81 that were used to determine points 87A, 87B, 87C of the trajectory 64A.

The inverse iso-displacement curves 204 are obtained at the same displacement increments (e.g. at the same time increments in the case of isochronous curves) as the displacement increments used to calculate the iso-displacement curves 79, 80, 81.

The determination module 67 obtains the position of the side edges 202A, 202B of the sock 200 by the intersection 208A, 208B between at least one iso-displacement curve 79, 80, 81 containing a point of the trajectory 64A and at least one inverse iso-displacement curve 204 corresponding to this iso-displacement curve 79, 80, 81.

When the iso-displacement curve 79, 80, 81 containing a point of the trajectory 64A is obtained after a number N1 of displacement increments, the inverse iso-displacement curve 204 used by the determination 67 module to obtain the intersection 208A, 208B is the one corresponding to a number N2 of displacement increments calculated by the equation:

$$N2=N-N1+1$$

where N is the total number of displacement increments required to connect the geographical point of origin 18 to the geographical point of destination 20 along the calculated trajectory.

Each intersection 208A, 208B thus comprises two points located on either side of the trajectory 64A.

The lateral edges 202A, 202B of the sock 200 are then obtained by joining respectively the intersection points 208A present on a first side of the trajectory 64A and the intersection points 208B on a second side of the trajectory.

The level of risk of loss of optimality of the actual trajectory flown by the aircraft, associated with a trajectory change from the calculated trajectory 64A is then defined as the transverse extent of the sock 200.

For example, the risk level is determined for each point on the calculated trajectory 64A as the transverse extent of the sock 200 calculated from the point on the trajectory 64A, perpendicular to the local tangent to the trajectory 64A.

In addition to the projection of the sock 200 in a horizontal plane, the determination module 67 advantageously determines a vertical projection of the sock 200 in a vertical plane, the level of risk being given by the vertical distance between the trajectory 64A and the upper and lower edges 209A, 209B of the sock 200.

Advantageously, for the determination of the upper and lower edges 209A, 209B, as illustrated in FIG. 7, the calculation module 64 determines vertical iso-displacement curves 210, 212, 214 in a vertical plane, around the vertical profile 216 of the calculated trajectory 64A.

Advantageously, the calculation module 64 calculates, from at least one chosen point 18 accessible to the aircraft, each vertical iso-displacement curve 210, 212, 214. The points of each vertical iso-displacement curve correspond to a displacement of the aircraft, after an increment of displacement with respect to another vertical iso-displacement curve 210, 212, 214 along the already determined horizontal trajectory.

As before, the determination module 67 establishes the sock 200 by calculating vertical inverse iso-displacement curves 218 from the destination geographic point 20 to the origin geographic point 18 in accordance with the method described above for the vertical iso-displacement curves 210, 212, 214 along the previously defined horizontal trajectory.

With reference to FIG. 8, the determination module 67 obtains the position of the upper and lower edges 209A, 209B of the sock 200 by the intersection 220A, 220B between at least one vertical iso-displacement curve 210, 212, 214 containing a point of the trajectory 64A and at least one vertical inverse iso-displacement curve 218 corresponding to this iso-displacement curve 210, 212, 214.

When the vertical iso-displacement curve 210, 210, 214 containing a point of the trajectory 64A is obtained after a number N1 of displacement increments, the vertical inverse iso-displacement curve 218 used by the determination 67 module to obtain the intersection 220A, 220B is the one corresponding to a number N2 of displacement increments calculated by the equation:

$$N2=N-N1+1$$

where N is the total number of displacement increments required to connect the geographical point of origin 18 to the geographical point of destination 20 along the calculated trajectory.

The top and bottom edges 209A, 209B of the sock 200 are then obtained by respectively connecting the intersection points 208A present above the trajectory 64A and the intersection points 208B present below the trajectory 64A.

As illustrated in FIG. 6, the display manager 44A displays on the display system 44, superimposed on a topographical representation of the environment in which the aircraft is flying, the trajectory 64A, 65A calculated in horizontal projection and around this calculated trajectory 64A, 65A, a representation of the sock 200 with its lateral edges 202A, 202B.

This representation of the sock 200 provides to the crew an indicator of the level of risk of loss of optimality of the mission characteristics, associated with a change in trajectory from the calculated trajectory 64A, 65A.

Indeed, the crew can directly assess, according to the width of the sock 200 at a given point of the trajectory 64A, 65A, whether the envisaged or imposed trajectory modification is likely to lead to no longer complying with the operational specifications, for example in terms of estimated arrival time and/or fuel consumed. In particular, where the sock 200 is narrow in a particular region, the crew is aware that any alteration in trajectory may have a significant impact on compliance with operational specifications.

Advantageously, the display manager 44A displays on the display system 44, superimposed on a topographical representation of the environment in which the aircraft is flying, the trajectory 64A, 65A calculated in vertical projection and around this calculated trajectory 64A, 65A, a representation of the sock 200 with its upper and lower edges 209A, 209B.

In the embodiment shown in FIG. 10, the calculation system 10 is integrated within an Electronic Flight Bag (EFB), or portable electronic device 100.

The portable electronic device 100 is for example connected to the databases 50, 52 by a wireless data link following a wireless transmission protocol for example of the Wifi type (e.g. following the IEEE 802.11 Standard), or Bluetooth (e.g. following the IEEE 802.15-1-2005 Standard).

In another embodiment, each iso-displacement curve calculated by the calculation module 64 is an fuel iso-consumption curve. Each inverse iso-displacement curve is also an fuel iso-consumption curve.

The first calculation module 64 is adapted, from any chosen point accessible to the aircraft, to establish a plurality of ifuel iso-consumption curves, corresponding to increments at distinct flight levels, over a predetermined increment of fuel consumed from the chosen point, and then to determine an extended fuel iso-consumption curve from the plurality of fuel iso-consumption curves.

By definition, an fuel iso-consumption curve is a curve connecting the points accessible to the aircraft from a given point with a given fuel consumption that corresponds to one or more increments of fuel consumed. Each increment of time consumed is chosen at a constant value, for example between 22.7 kg (50 pounds) and 453.6 kg (1,000 pounds), in particular between 36.3 kg (80 pounds) and 54.4 kg (120 pounds).

In this example, each fuel iso-consumption curve is determined from a chosen point by calculating from the chosen point all points accessible to the aircraft, at a given airspeed, taking into account the weather context, in particular the wind direction and intensity, as provided by the retrieval module 60 and the aircraft performance, as determined by the determination module 62.

As before, the first calculation module 64 is adapted to selectively exclude points which are located in forbidden flight zones or levels 24, dangerous weather zones 28 and/or turbulence zones 30. On the other hand, the first calculation module 64 is able to also exclude points which are not located in a satellite coverage zone 32.

The first calculation module 64 is then adapted to define an optimal trajectory 64A by choosing successive points of the optimal trajectory 64A from successive extended fuel consumption curves.

In another embodiment, the iso-displacement curves are iso-cost curves, where cost is defined as a function of travel time and fuel consumed, for example as a ratio of travel time and fuel consumed. Each inverse iso-displacement curve is also an iso-cost curve.

Each displacement increment is a cost increment of a given constant value.

Each iso-cost curve is determined from a selected point by calculating from the selected point all points accessible to the aircraft, at a given airspeed, taking into account the weather context, in particular the wind direction and intensity, as provided by the retrieval module 60 and the aircraft performance, as determined by the calculation functions of the application 68.

As before, the first calculation module 64 is adapted to selectively exclude points which are located in forbidden flight zones or levels 24, dangerous weather zones 28 and/or turbulence zones 30. On the other hand, the first calculation module 64 is able to also exclude points which are not located in a satellite coverage zone 32.

The first calculation module 64 is then adapted to define an optimal trajectory 64A by choosing successive points of the optimal trajectory 64A from successive extended iso-fuel-consumption curves.

In yet another variant of all the above-described embodiments, the iso-displacement curves are not determined at a given airspeed, but according to a given airspeed profile, for example as a function of altitude or at maximum thrust.

What is claimed is:

1. An aircraft mission calculation system, comprising:
   a calculation engine configured for calculating trajectories of an aircraft during a mission, the calculation engine being configured to calculate an optimal calculated mission trajectory between a geographical point of origin and a geographical point of destination, as a function of aircraft performance, operational mission specifications and a weather context in a mission volume between the geographical point of origin and the geographical point of destination;
   the calculation engine being configured to calculate a plurality of iso-displacement curves from the geographical point of origin to the geographical point of destination, and to calculate the optimal calculated mission trajectory from points located on the iso-displacement curves; and a display configured to display the optimal calculated mission trajectory on the display, the calculation engine being configured to determine a risk level of a loss of optimality of a trajectory actually taken by the aircraft, the trajectory actually taken by the aircraft being modified with respect to the optimal calculated mission trajectory, the display being configured to display, in addition to the optimal calculated mission trajectory, an indicator of the risk level determined by the calculation engine, wherein each iso-displacement curve is:
  an isochronous curve and the calculation engine is configured to calculate a trajectory minimizing a time between the geographical point of origin and the geographical point of destination, or
  a fuel iso-consumption curve and the calculation engine is configured to calculate a trajectory minimizing a fuel consumption between the geographical point of origin and the geographical point of destination, or
  an iso-cost curve and the calculation engine is configured to calculate a trajectory minimizing a cost, which is defined as a function of travel time and fuel consumed, between the geographical point of origin and the geographical point of destination;

wherein the loss of optimality of the trajectory actually taken by the aircraft is:
  a lengthening of the flight time between the geographical point of origin and the geographical point of destination compared to the optimal calculated mission trajectory, and/or
  an increase in fuel consumption compared to the optimal calculated mission trajectory, wherein the risk level of the loss of optimality is a level of a risk of the lengthening of the flight time and/or the increase in fuel consumption upon a change in trajectory from the optimal calculated mission trajectory and, wherein the calculation engine is configured to determine the risk level by calculating, from the calculated mission trajectory, inverse iso-displacement curves from the geographical point of destination to the geographical point of origin and then, to determine an intersection between at least one iso-displacement curve and at least one inverse iso-displacement curve.

2. The system according to claim 1, wherein the risk level is determined at a plurality of points of the calculated mission trajectory, the display being configured to display a risk level indicator at several points of the calculated mission trajectory.

3. The system according to claim 1, wherein the calculation engine is configured to determine a sock around the calculated mission trajectory, the sock containing the calculated mission trajectory, the risk level being given by a distance between the calculated mission trajectory and edges of the sock, the display being configured to display a risk level indicator formed by at least the edges of the sock.

4. The system according to claim 3, wherein the calculation engine is configured to determine the sock in projection in a horizontal plane, the risk level being given by a transverse distance between the calculated mission trajectory and side edges of the sock.

5. The system according to claim 3, wherein the calculation engine is configured to determine the sock in projection in a vertical plane, the risk level being given by a distance between the calculated mission trajectory and upper and lower edges of the sock.

6. The system according to claim 1, wherein, when the iso-displacement curve containing a given point of the calculated mission trajectory is obtained after a number N1 of displacement increments, the inverse iso-displacement curve used by the calculation engine to obtain the intersection is the inverse iso-displacement curve corresponding to a number N2 of displacement increments calculated by the equation:

$$N2=N-N1+1$$

where N is a total number of displacement increments required to connect the geographical point of origin to the geographical point of destination along the calculated mission trajectory.

7. The system according to claim 1, wherein the calculation engine is configured to determine a sock in projection in a vertical plane, the risk level being given by a distance between the calculated mission trajectory and upper and lower edges of the sock, the iso-displacement curves and inverse iso-displacement curves are respectively vertical iso-displacement curves and vertical inverse iso-displacement curves defined along the calculated mission trajectory in projection in a vertical plane.

8. The system according to claim 1, wherein the calculation engine is configured to calculate a plurality of iso-displacement curves from at least one selected point accessible to the aircraft, at displacement intervals corresponding to several successive displacement increments of the aircraft from the selected point, the iso-displacement curves being obtained at the displacement interval for a displacement of the aircraft to a given flight level from displacements of the aircraft at separate flight levels, the calculation engine being configured to determine, on a basis of the iso-displacement curves to the given flight level obtained at separate flight levels, taken at a same one of the displacement intervals, at least one extended iso-displacement curve to the given flight level maximizing the displacement of the aircraft from the geographical point of origin or minimizing the displacement of the aircraft towards the geographical point of destination, the calculation engine being configured to define the calculated mission trajectory from a plurality of trajectory segments, each trajectory segment being defined at a given flight level for a plurality of iso-displacement curves at the flight level corresponding to the given flight level from an extended iso-displacement curve or/and towards an extended iso-displacement curve.

9. The system according to claim 1, wherein the loss of optimality of the trajectory is a flight time increase greater than a time increment for calculating isochronous curves, and/or a fuel consumption greater than a fuel quantity increment for calculating iso-fuel consumption curves.

10. An aircraft mission calculating method, implemented by a trajectory calculation system comprising a calculation engine configured to calculate a mission trajectory of the aircraft, the method comprising:
  calculating, via the calculation engine, an optimal calculated mission trajectory between a geographical point of origin and a geographical point of destination, as a function of aircraft performance, mission operational specifications and a weather context, in a mission volume between the geographical point of origin and the geographical point of destination, the calculation engine calculating a plurality of iso-displacement curves from the geographical point of origin to the geographical point of destination, and calculating the optimal calculated mission trajectory from points on the iso-displacement curves;

displaying the optimal calculated mission trajectory on a display of the mission calculation system; and determining, via the calculation engine, a risk level of loss of optimality of a trajectory actually taken by the aircraft, the trajectory actually taken by the aircraft being modified with respect to the optimal calculated mission trajectory, the display displaying, in addition to the optimal calculated mission trajectory, an indicator of the determined risk level, wherein each iso-displacement curve is:

an isochronous curve and the calculation engine is configured to calculate a trajectory minimizing a time between the geographical point of origin and the geographical point of destination, or a fuel iso-consumption curve and the calculation engine is configured to calculate a trajectory minimizing a fuel consumption between the geographical point of origin and the geographical point of destination, or an iso-cost curve and the calculation engine is configured to calculate a trajectory minimizing a cost, which is defined as a function of travel time and fuel consumed, between the geographical point of origin and the geographical point of destination;

wherein the loss of optimality of the trajectory actually taken by the aircraft is:

a lengthening of the flight time between the geographical point of origin and the geographical point of destination compared to the optimal calculated mission trajectory, and/or an increase in fuel consumption compared to the optimal calculated mission trajectory, wherein the risk level of the loss of optimality is a level of a risk of the lengthening of the flight time and/or the increase in fuel consumption upon a change in trajectory from the optimal calculated mission trajectory and, wherein the calculation engine determines the risk level by calculating, from the calculated mission trajectory, inverse iso-displacement curves from the geographical point of destination to the geographical point of origin and then by determining an intersection between at least one iso-displacement curve and at least one inverse iso-displacement curve.

11. The method according to claim 10, comprising determining, via the calculation engine, a sock around the calculated mission trajectory, the sock containing the calculated mission trajectory, the risk level being given by a distance between the calculated mission trajectory and edges of the sock, the display displaying a risk level indicator formed by at least the edges of the sock.

12. The method according to claim 11, wherein the calculation engine determines the sock in projection in a horizontal plane, the risk level being given by a transverse distance between the calculated mission trajectory and side edges of the sock or/and wherein the calculation engine determines the sock in projection in a vertical plane, the risk level being defined by the distance between the calculated mission trajectory and upper and lower edges of the sock.

13. An aircraft mission calculation system, comprising:

a calculation engine configured for calculating trajectories of an aircraft during a mission, the calculation engine being configured to calculate an optimal calculated mission trajectory between a geographical point of origin and a geographical point of destination, as a function of aircraft performance, operational mission specifications and a weather context in a mission volume between the geographical point of origin and the geographical point of destination;

the calculation engine being configured to calculate a plurality of iso-displacement curves from the geographical point of origin to the geographical point of destination, and to calculate the optimal calculated mission trajectory from points located on the iso-displacement curves; and a display configured to display the calculated mission trajectory on the display, the calculation engine being configured to determine a risk level of a loss of optimality of a trajectory actually taken by the aircraft, the trajectory actually taken by the aircraft being modified with respect to the optimal calculated mission trajectory, the display being configured to display, in addition to the optimal calculated mission trajectory, an indicator of the risk level determined by the calculation engine, wherein the calculation engine is configured to determine a sock around the calculated mission trajectory, the sock containing the calculated mission trajectory, the risk level being given by a distance between the calculated mission trajectory and edges of the sock, the display being configured to display a risk level indicator formed by at least the edges of the sock, wherein each iso-displacement curve is:

an isochronous curve and the calculation engine is configured to calculate a trajectory minimizing a time between the geographical point of origin and the geographical point of destination, or a fuel iso-consumption curve and the calculation engine is configured to calculate a trajectory minimizing a fuel consumption between the geographical point of origin and the geographical point of destination, or an iso-cost curve and the calculation engine is configured to calculate a trajectory minimizing a cost, which is defined as a function of travel time and fuel consumed, between the geographical point of origin and the geographical point of destination;

wherein the loss of optimality of the trajectory actually taken by the aircraft is:

a lengthening of the flight time between the geographical point of origin and the geographical point of destination compared to the optimal calculated mission trajectory, and/or an increase in fuel consumption compared to the optimal calculated mission trajectory, wherein the risk level of the loss of optimality is a level of a risk of the lengthening of the flight time and/or the increase in fuel consumption upon a change in trajectory from the optimal calculated mission trajectory, wherein the calculation engine is configured to determine the risk level by calculating, from the calculated mission trajectory, inverse iso-displacement curves from the geographical point of destination to the geographical point of origin and then, to determine an intersection between at least one iso-displacement curve and at least one inverse iso-displacement curve, the sock being obtained from the intersection between the iso-displacement curves and the inverse iso-displacement curves.

* * * * *